(12) United States Patent
Chen

(10) Patent No.: US 11,962,768 B2
(45) Date of Patent: Apr. 16, 2024

(54) ENCODING METHOD AND APPARATUS, DECODING METHOD AND APPARATUS, AND DEVICES THEREFOR

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 148 days.

(21) Appl. No.: 17/792,205

(22) PCT Filed: Sep. 16, 2020

(86) PCT No.: PCT/CN2020/115663
§ 371 (c)(1),
(2) Date: Jul. 12, 2022

(87) PCT Pub. No.: WO2021/143177
PCT Pub. Date: Jul. 22, 2021

(65) Prior Publication Data
US 2023/0104806 A1   Apr. 6, 2023

(30) Foreign Application Priority Data
Jan. 13, 2020 (CN) .......... 202010033536.9

(51) Int. Cl.
*H04N 19/117* (2014.01)
*H04N 19/70* (2014.01)

(52) U.S. Cl.
CPC .......... *H04N 19/117* (2014.11); *H04N 19/70* (2014.11)

(58) Field of Classification Search
CPC .... H04N 19/117; H04N 19/70; H04N 19/172; H04N 19/174; H04N 19/177;
(Continued)

(56) References Cited

U.S. PATENT DOCUMENTS

| | | | |
|---|---|---|---|
| 10,419,757 B2 | 9/2019 | Chen et al. | |
| 2018/0041779 A1 | 2/2018 | Zhang et al. | |
| 2018/0063527 A1* | 3/2018 | Chen .................. | H04N 19/117 |

FOREIGN PATENT DOCUMENTS

| | | |
|---|---|---|
| CN | 102857746 A | 1/2013 |
| CN | 103210650 A | 7/2013 |

(Continued)

OTHER PUBLICATIONS

International Search Report for PCT/CN2020/115663 dated Dec. 18, 2020 and its English translation provided by WIPO.
(Continued)

*Primary Examiner* — Joseph W Becker
(74) *Attorney, Agent, or Firm* — Ladas & Parry, LLP

(57) ABSTRACT

The present disclosure provides an encoding method, a decoding method, an encoding apparatus, a decoding apparatus and devices thereof. The method may include: in response to determining that an adaptive loop filter (ALF) sequence control enabling flag of a sequence parameter set (SPS) syntax indicates allowing a current sequence to enable an ALF, encoding a cross-component adaptive loop filter (CCALF) sequence control enabling flag in the SPS syntax. The technical solutions of the present disclosure can improve the encoding performance.

20 Claims, 6 Drawing Sheets

---

401 — Obtain a luma component reconstruction value and a chroma component reconstruction value of each pixel position of the current processing unit 402 — For a current pixel position of the current processing unit, determine a target pixel position of the current processing unit associated with the current pixel position 403 — Based on the luma component reconstruction value of the target pixel position and the luma component reconstruction value of a neighboring pixel position of the target pixel position, perform CCALF-based filtering to obtain a chroma component offset value of the current pixel position 404 — Based on the chroma component reconstruction value of the current pixel position and the chroma component offset value of the current pixel position, obtain a target chroma component reconstruction value of the current pixel position

(58) Field of Classification Search
CPC .... H04N 19/186; H04N 19/82; H04N 19/124; H04N 19/147; H04N 19/159; H04N 19/176; H04N 19/44; H04N 19/52; H04N 19/61; H04N 19/91
See application file for complete search history.

(56) References Cited

FOREIGN PATENT DOCUMENTS

| | | |
|---|---|---|
| CN | 108605143 A | 9/2018 |
| CN | 109600611 A | 4/2019 |
| CN | 109691102 A | 4/2019 |
| CN | 113132739 A | 7/2021 |
| JP | 2013126056 A | 6/2013 |

OTHER PUBLICATIONS

Written Opinion of the International Searching Authority for PCT/CN2020/115663 dated Dec. 18, 2020 and its English translation provided by Google Translate.
State Intellectual Property Office of the People's Republic of China, Office Action and Search Report Issued in Application No. 202010033536.9, dated Nov. 24, 2021, 28 pages (Submitted with Machine/Partial Translation).
State Intellectual Property Office of the People's Republic of China, Office Action and Search Report Issued in Application No. 202010997410.3, dated Jun. 2, 2021, 19 pages (Submitted with Machine/Partial Translation).
State Intellectual Property Office of the People's Republic of China, Office Action and Search Report Issued in Application No. 202010997435.3, dated Jun. 2, 2021, 21 pages (Submitted with Machine/Partial Translation).
State Intellectual Property Office of the People's Republic of China, Office Action and Search Report Issued in Application No. 202010997437.2, dated Jun. 1, 2021, 21 pages (Submitted with Machine/Partial Translation).
State Intellectual Property Office of the People's Republic of China, Office Action and Search Report Issued in Application No. 202010997410.3, dated Sep. 15, 2021, 27 pages (Submitted with Machine/Partial Translation).
State Intellectual Property Office of the People's Republic of China, Office Action and Search Report Issued in Application No. 202010997435.3, dated Sep. 2, 2021, 25 pages (Submitted with Machine/Partial Translation).
State Intellectual Property Office of the People's Republic of China, Office Action and Search Report Issued in Application No. 202010997437.2, dated Sep. 2, 2021, 25 pages (Submitted with Machine/Partial Translation).
Anand Meher Kotra et al., "CE5-related: High level syntax modifications for CCALF (combination of JVET-Q0253 and JVET-Q0520)", JVET-Q0782-v2, Jan. 12, 2020, Joint Video Experts Team (JVET) of ITU-T SG16 WP 3 and ISO/IEC JTC1/SC 29/WG 11,17th Meeting: Brussels, BE, Jan. 7-17, 2020, 7 pages.
Ching-Yeh Chen et al., "Description of Core Experiment 5(CE5): Cross Component Adaptative Loop Filtering," (JVET-P2025-v4), Nov. 5, 2019, Joint Video Experts Team (JVET) of ITU-T Sg 16 WP 3 and ISO/IEC JTC 1/SC 29/WG 11, 16th Meeting: Geneva, CH, Oct. 1-11, 2019, 8 pages.
Kiran Misra et al., "CE5-2.1, CE5-2.2: Cross Component Adaptive Loop Filter," (JVET-P0080), Sep. 18, 2019, Joint Video Experts Team (JVET) of ITU-T SG16 WP 3 and ISO/IEC JTC 1/SC 29/WG 11, 16th Meeting: Geneva, CH,Oct. 1-11, 2019, 8 pages.
Nan Hu et al., "CE5-2.1,CE5-3.1: Multiplication removal for cross component adaptive loop filter and 5×5 filter shape" (JVET-Q0073), Jan. 8, 2020, Joint Video Experts Team (JVET) of ITU-T SG 16 WP 3 and ISO/IEC JTC 1/SC 29/WG 11, 17th Meeting: Brussels, BE, Jan. 7-17, 2020, 7 pages.
Kiran Misra et al., "On Cross Component Adaptive Loop Filter for Video Compression," Nov. 15, 2019, 2019 Picture Coding Symposium (PCS), 5 pages.
Anand Meher Kotra et al., "CE5-related High level syntax modifications for CCALF," (combination of JVET Q0253 and JVET Q0520, JVET-Q0782-v1), Jan. 11, 2020, Joint Video Experts Team (JVET) of ITU-T SG 16 WP 3 and ISO/IEC JTC 1/SC 29/WG 11, 17th Meeting: Brussels, BE, Jan. 7-17, 2020, 6 pages.
K. Misra et al., "CE5 Common Base: Cross Component Adaptive Loop Filter (JVET- Q0058)", Dec. 23, 2019, Joint Video Experts Team (JVET) of ITU-T SG 16 WP 3 and ISO/IEC JTC 1/SC 29/WG 11, 17th Meeting: Brussels, BE, Jan. 7-17, 2020, 5 pages.
Anand Meher Kotra et al., "CE5-related High level syntax modifications for CCALF," (JVET-Q0253-v1), Dec. 30, 2019, Joint Video Experts Team (JVET) of ITU-T SG 16 WP 3 and ISO/IEC JTC 1/SC 29/WG 11, 17th Meeting: Brussels, BE, Jan. 7-17, 2020, 6 pages.
Olena Chubach et al., "CE5-related: On CC-ALF modifications related to coefficients and signalling"(JVET-Q0190-v2), Jan. 10, 2020, Joint Video Experts Team (JVET) of ITU-T SG 16 WP 3 and ISO/IEC JTC 1/SC 29/WG 11, 17th Meeting: Brussels, BE, Jan. 7-17, 2020, 11 pages.
Andrew Segall et al., "BoG Report on CE5 Related Contributions" (JVET-Q0780), Jan. 11, 2020, Joint Video Experts Team (JVET) of ITU-T SG 16 WP 3 and ISO/IEC JTC 1/SC 29/WG 11, 17th Meeting: Brussels, BE, Jan. 7-17, 2020, 12 pages.

\* cited by examiner

ENCODING METHOD AND APPARATUS, DECODING METHOD AND APPARATUS, AND DEVICES THEREFOR

CROSS REFERENCE TO RELATED APPLICATIONS

This application is a US National Phase of a PCT Application No. PCT/CN2020/115663 filed on Sep. 16, 2020, which claims priority to Chinese Patent Application No. 202010033536.9 filed on Jan. 13, 2020, the disclosures of which are incorporated herein by reference in their entireties.

TECHNICAL FIELD

The present disclosure relates to the field of encoding and decoding technologies, and in particular to an encoding method, a decoding method, an encoding apparatus, a decoding apparatus, and devices thereof.

BACKGROUND

To save spaces, video pictures are always transmitted after being encoded. A complete video encoding method may include processes such as prediction, transformation, quantization, entropy encoding, filtering, etc. Where, the prediction encoding may include intra encoding and inter encoding. Further, the inter encoding refers to an operation of utilizing a temporal domain correlation of a video to predict a current pixel by using pixels of neighboring encoded pictures, so as to effectively remove temporal domain redundancy of the video. Intra encoding refers to an operation of utilizing a spatial domain correlation of a video to predict a current pixel by using pixels of an encoded block of a current picture, so as to remove spatial domain redundancy of the video.

In the related arts, a loop filter is used to reduce the problems of block effect of pictures or poor picture effect or the like so as to improve the quality of the pictures whereas CCALF, as an implementation of the loop filter, can be adopted to achieve loop filtering. But, the CCALF in the related arts has poor filtering effect and poor encoding performance.

SUMMARY

The present disclosure provides an encoding method, a decoding method, an encoding apparatus, a decoding apparatus, and devices thereof, so as to improve encoding performances.

The present disclosure provides an encoding method, including:

in response to determining that an adaptive loop filter (ALF) sequence control enabling flag of a sequence parameter set (SPS) syntax indicates allowing a current sequence to enable an ALF, encoding a cross-component adaptive loop filter (CCALF) sequence control enabling flag in the SPS syntax.

The present disclosure provides a decoding method, including:

in response to determining that an adaptive loop filter (ALF) sequence control enabling flag of a sequence parameter set (SPS) syntax indicates allowing a current sequence to enable an ALF, decoding a cross-component adaptive loop filter (CCALF) sequence control enabling flag from the SPS syntax.

The present disclosure provides an encoding apparatus, including:

a determining module, configured to determine whether an adaptive loop filter (ALF) sequence control enabling flag of a sequence parameter set (SPS) syntax indicates allowing a current sequence to enable an ALF;

an encoding module, configured to, when the ALF sequence control enabling flag of the SPS syntax indicates allowing the current sequence to enable ALF, encode a CCALF sequence control enabling flag from the SPS syntax.

The present disclosure provides a decoding apparatus, including:

a determining module, configured to determine whether an adaptive loop filter (ALF) sequence control enabling flag of a sequence parameter set (SPS) syntax indicates allowing a current sequence to enable an ALF;

a decoding module, configured to, when the ALF sequence control enabling flag of the SPS syntax indicates allowing the current sequence to enable ALF, decode a CCALF sequence control enabling flag from the SPS syntax.

The present disclosure provides an encoder device, including: a processor and a machine readable storage medium, where the machine readable storage medium stores machine executable instructions executable by the processor;

the processor is configured to execute the machine executable instructions to perform the following steps:

in response to determining that an adaptive loop filter (ALF) sequence control enabling flag of a sequence parameter set (SPS) syntax indicates allowing a current sequence to enable an ALF, encoding a cross-component adaptive loop filter (CCALF) sequence control enabling flag in the SPS syntax.

The present disclosure provides a decoder device, including: a processor and a machine readable storage medium, where the machine readable storage medium stores machine executable instructions executable by the processor;

the processor is configured to execute the machine executable instructions to perform the following steps:

in response to determining that an adaptive loop filter (ALF) sequence control enabling flag of a sequence parameter set (SPS) syntax indicates allowing a current sequence to enable an ALF, decoding a cross-component adaptive loop filter (CCALF) sequence control enabling flag from the SPS syntax.

As can be seen from the above technical solutions, in the embodiments of the present disclosure, higher performance improvement can be achieved with low complexity. The design of the high syntax provides flexible use of the CCALF, improves the loop filtering accuracy of the CCALF and the loop filtering effect of the CCALF, and increases the encoding performance, such that the reconstruction value of the current processing unit is more approximate to an original pixel.

DETAILED DESCRIPTION OF THE EMBODIMENTS

The terms used in the embodiments of the present disclosure are only for describing specific embodiments, rather than limiting the embodiments of the present disclosure. The singular forms of "a", "said" and "the" used in the present disclosure and claims are also intended to include plural forms, unless the context clearly indicates otherwise. It should also be understood that the term "and/or" as used herein refers to any one or all possible combinations of one or more associated listed items. It should be understood that although the terms such as first, second, third, etc. may be used in the embodiments of the present disclosure to describe various information, these information should not be limited by these terms. These terms are only used to distinguish the same type of information from each other. For example, without departing from the scope of the present disclosure, first information can also be referred to as second information, and similarly, second information can also be referred to as first information, thus, the selection of the terms depends on the context. In addition, the word "if" used can be interpreted as "upon" or "when" or "in response to".

Embodiments of the present disclosure provide an encoding method, a decoding method, an encoding apparatus, a decoding apparatus and devices thereof, which may involve the following concepts.

Figure 1:
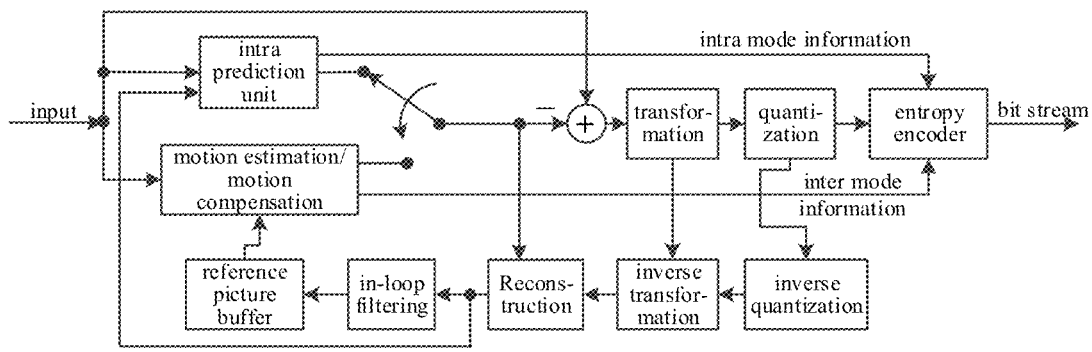
FIG. 1 is a schematic diagram illustrating an encoding and decoding framework.

Encoding and decoding framework: FIG. 1 is a schematic diagram of an encoding and decoding framework. An encoding and decoding framework may be used to implement an encoder processing process of embodiments of the present disclosure and a decoder processing process of embodiments of the present disclosure. Illustratively, as shown in FIG. 1, a complete encoding and decoding framework may include but not limited to: a prediction module, a transformation module, a quantization module, an entropy encoder, an inverse transformation module, an inverse quantization module, a reconstruction module, an in-loop filter, and a reference picture buffer and the like. The prediction may include intra prediction and inter prediction (i.e. motion estimation/motion compensation). At the encoder, through cooperation of these modules, the encoder processing process can be achieved, and at the decoder, through cooperation of these modules, the decoder processing process can be achieved.

Intra prediction refers to an operation of utilizing a spatial domain correlation of a video to perform prediction by an encoded block of current blocks, so as to remove spatial domain redundancy of the video. The intra prediction provides multiple prediction modes, each of which corresponds to one texture direction (except for directional mode (DC mode)). For example, if a picture texture is arranged horizontally, a horizontal prediction mode can predict picture information better.

Inter prediction refers to an operation of utilizing a temporal domain correlation of a video to predict pixels of a current picture by using pixels of a neighboring encoded picture because a video sequence contains a strong temporal domain correlation, so as to effectively remove temporal domain redundancy of the video. Inter prediction parts in video encoding standards all adopt a block-based motion compensation technology of which the main principle is to find a best matching block in a previously-encoded picture for each pixel block of the current picture, where this process is referred to as Motion Estimation (ME).

Transformation: in a video encoding process, the transformation refers to transforming a picture described in the form of pixels in a spatial domain into a picture of a transformed domain which is denoted in the form of transformation coefficients. Since most pictures contain many flat regions and slowly-changing regions, decentralized distribution of picture energy in the spatial domain is transformed into centralized distribution in a transformed domain in a proper transformation process, so as to remove frequency domain correlation between signals and effectively compress bit stream in cooperation with quantization process.

Loop filter: the loop filter is used to reduce the problems of block effect of a picture or a poor picture effect, so as to improve picture quality. For example, the loop filter may include but not limited to: deblocking filter, Sample Adaptive Offset (SAO) filter, Adaptive Loop Filter (ALF) and Cross-Component Adaptive Loop Filter (CCALF) and the like.

The basic principle of the ALF: with use of the filter, pixel values of the filtered reconstructed picture block are more approximate to pixel values of its original pixels. The basic principle of the CCALF: with filtering with corresponding luma values, compensation pixel values of a chroma reconstruction block (usually chroma values having been subjected to ALF filtering) are more approximate to the pixel values of the chroma original picture block.

Flag coding: in a video encoding, there are many modes. For a particular block, one of these modes may be adopted. In order to represent which mode is adopted, each block needs to mark the mode by encoding a corresponding flag. For example, for an encoder, a value of the flag is determined by encoder decision, and then the value of the flag is encoded and transmitted to a decoder. For a decoder, by decoding the value of the flag, it is determined whether a corresponding mode is used.

Sequence parameter set (SPS): this set has flags for determining whether to allow some tools (methods) to be enabled in the entire video sequence (i.e. multiple frames of video picture). If the value of the flag is 1, a corresponding tool (method) is allowed to be enabled in the video sequence; otherwise, the tool (method) cannot be enabled in the encoding process of the video sequence.

Picture parameter set (PPS): this set has flags for determining whether to allow some tools (methods) to be enabled in a picture. If the value of the flag is 1, a corresponding tool (method) is allowed to be enabled in the picture; otherwise, the tool (method) cannot be enabled in the encoding process of the picture.

Picture header: for common information of a particular frame of picture, different from the picture parameter set (used by different pictures), the picture header only stores common information of a current picture. For example, when the current picture contains a plurality of slices, the plurality of slices may share the information in the picture header. The picture header has flags for determining whether to allow some tools (methods) to be enabled or not in the current picture. If the value of the flag is 1, a corresponding tool (method) is allowed to be enabled in the current picture; otherwise, the tool (method) cannot be enabled in the encoding process of the current picture.

Slice header: one frame of picture may include one or more slices. For each slice, in the header information of the slice, flags for determining whether to allow some tools (methods) to be enabled in the slice are present. If the value of the flag is 1, a corresponding tool (method) is allowed to be enabled in the slice; otherwise, the tool (method) cannot be enabled in the encoding process of the slice.

High-level syntax: the high-level syntax is used to represent whether to allow enabling some tools (methods), that is, by the high-level syntax, some tools (methods) are allowed to be enabled or some tools (methods) are prohibited to be enabled. Illustratively, referring to the above introductions, the high-level syntax may be a high-level syntax of the sequence parameter set level, or a high-level syntax of the picture parameter set level, or a high-level syntax of the slice header level, or a high-level syntax of the picture header level, which is not limited herein as long as they can achieve the above functions.

Rate distortion optimized (RDO): there are two indicators for evaluating encoding efficiency: bit rate and PSNR (peak signal to noise ratio). The smaller the bit stream is, the larger the compression rate is; and the higher the PSNR is, the better the quality of a reconstructed picture is. In mode selection, a discriminant formula is essentially a comprehensive evaluation of the two. For example, a cost corresponding to a mode can be calculated according to the following formula: $J(mode)=D+\lambda*R$, where D represents a distortion, usually measured by using a SSE (sum-of-squared differences) indicator, and SSE refers to a sum of mean square of differences between a reconstructed picture block and a source picture; $\lambda$ represents a Lagrange multiplier; R represents an actual number of bits required for encoding a picture block in this mode, including a total number of bits required for encoding mode information, motion information, residuals, etc.

In the related arts, a loop filter is used to reduce the problems of block effect of pictures or poor picture effect or the like so as to improve the quality of the pictures. CCALF, as an implementation of the loop filter, can be adopted to achieve loop filtering. But, the CCALF in the related arts has poor filtering effect and poor encoding performance. For the above findings, in a filtering process of the CCALF, an embodiment of the present disclosure provides an encoding and decoding method to improve the filtering effect of the CCALF and the encoding performance.

In combination with specific embodiments, the encoding methods and the decoding methods of the embodiments of the present disclosure will be described in details below.

Embodiment 1: an embodiment of the present disclosure provides an encoding method which may be applied to an encoder. The method may include: if an adaptive loop filter (ALF) sequence control enabling flag of a sequence parameter set (SPS) syntax indicates allowing a current sequence to enable ALF, encoding a cross-component adaptive loop filter (CCALF) sequence control enabling flag in the SPS syntax, where the CCALF sequence control enabling flag indicates allowing the current sequence to enable CCALF, or the CCALF sequence control enabling flag indicates disallowing the current sequence to enable CCALF.

Illustratively, if the ALF sequence control enabling flag of the SPS syntax indicates allowing the current sequence to enable the ALF and the current sequence has a chroma component, the CCALF sequence control enabling flag is encoded in the SPS syntax.

Illustratively, if the ALF sequence control enabling flag of the SPS syntax indicates disallowing the current sequence to enable the ALF, the CCALF sequence control enabling flag is prohibited to be encoded in the SPS syntax. For example, it is no need to encode the CCALF sequence control enabling flag in the SPS syntax, and it is directly indicated that disallowing the current sequence to enable the CCALF.

Figure 2:
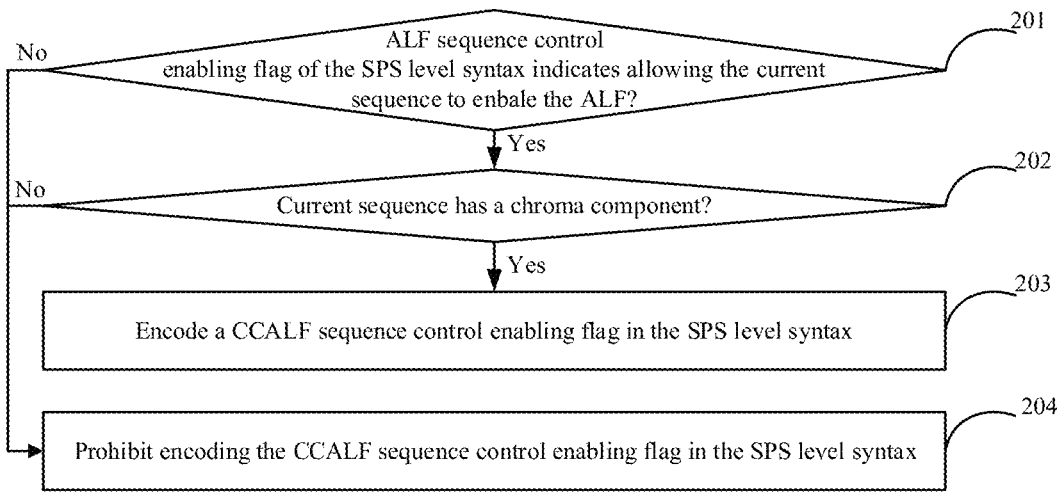
FIG. 2 is a flowchart illustrating an encoding method according to an embodiment of the present disclosure.

FIG. 2 is a flowchart illustrating the encoding method, which may be applied to an encoder. The method may include:

At step 201, it is determined whether the ALF sequence control enabling flag of the SPS syntax indicates allowing the current sequence to enable the ALF. If yes, step 202 is performed; if not, step 204 is performed.

At step 202, it is determined whether the current sequence has a chroma component.

If yes, step 203 is performed; if not, step 204 is performed.

At step 203, a CCALF sequence control enabling flag is encoded in the SPS syntax.

At step 204, the CCALF sequence control enabling flag is prohibited to be encoded in the SPS syntax.

Illustratively, when the CCALF sequence control enabling flag is encoded in the SPS syntax, if a general constraint information syntax of CCALF indicates disallowing enabling the CCALF, the CCALF sequence control enabling flag is a first value; or, if the general constraint information syntax of the CCALF indicates allowing enabling the CCALF, the CCALF sequence control enabling flag is a second value. For example, the first value indicates disallowing the current sequence to enable the CCALF; the second value indicates allowing the current sequence to enable the CCALF. For example, the first value may be 0 and the second value may be 1; or, the first value may be 1 and the second value may be 0. Of course, the above is only an example, and the first value and the second value are not limited herein.

In combination with several specific application scenarios, the above technical solutions of the embodiments of the present disclosure are described below.

Application scenario 1: if the ALF sequence control enabling flag of the SPS syntax indicates allowing the current sequence to enable the ALF, the CCALF sequence control enabling flag is encoded in the SPS syntax.

Application scenario 2: if the ALF sequence control enabling flag of the SPS syntax indicates allowing the current sequence to enable the ALF and the current sequence has a chroma component, the CCALF sequence control enabling flag is encoded in the SPS syntax.

Application scenario 3: if the ALF sequence control enabling flag of the SPS syntax indicates disallowing the current sequence to enable the ALF, the CCALF sequence control enabling flag is prohibited to be encoded in the SPS syntax.

Application scenario 4: if the ALF sequence control enabling flag of the SPS syntax indicates allowing the current sequence to enable the ALF and the current sequence does not have a chroma component, the CCALF sequence control enabling flag is prohibited to be encoded in the SPS syntax.

Application scenario 5: if the ALF sequence control enabling flag of the SPS syntax indicates allowing the current sequence to enable the ALF and a PPS syntax indicates an ALF syntax is present in a picture header, an ALF picture header control enabling flag is encoded in a picture header syntax. Further, if the ALF picture header control enabling flag of the picture header syntax indicates allowing a current picture to enable the ALF and the CCALF sequence control enabling flag of the SPS syntax indicates allowing the current sequence to enable the CCALF, a CCALF picture header control enabling flag is encoded in the picture header syntax.

Illustratively, encoding the ALF picture header control enabling flag in the picture header syntax may include: encoding ALF picture header syntax information in the picture header syntax, where the ALF picture header syntax information includes the ALF picture header control enabling flag. Of course, the ALF picture header syntax information may also include other information relating to the ALF, which is not limited herein.

Illustratively, encoding the CCALF picture header control enabling flag in the picture header syntax may include: encoding CCALF picture header syntax information in the picture header syntax, where the CCALF picture header syntax information includes the CCALF picture header control enabling flag. Of course, the CCALF picture header syntax information may also include other information relating to the CCALF, which is not limited herein.

Application scenario 6: if the ALF sequence control enabling flag of the SPS syntax indicates allowing the current sequence to enable the ALF and the PPS syntax indicates the ALF syntax is present in the picture header, the ALF picture header control enabling flag is encoded in the picture header syntax. Further, if the ALF picture header control enabling flag of the picture header syntax indicates allowing the current picture to enable the ALF and the CCALF sequence control enabling flag of the SPS syntax indicates disallowing the current sequence to enable the CCALF, the CCALF picture header control enabling flag is prohibited to be encoded in the picture header syntax.

Application scenario 7: if the ALF sequence control enabling flag of the SPS syntax indicates allowing the current sequence to enable the ALF and the PPS syntax indicates the ALF syntax is present in the picture header, the ALF picture header control enabling flag is encoded in the picture header syntax. Further, if the ALF picture header control enabling flag of the picture header syntax indicates disallowing the current picture to enable the ALF, the CCALF picture header control enabling flag is prohibited to be encoded in the picture header syntax.

Illustratively, if the ALF picture header control enabling flag of the picture header syntax indicates disallowing the current picture to enable the ALF, regardless of the fact that the CCALF sequence control enabling flag of the SPS syntax indicates that the current sequence is allowed or disallowed to enable the CCALF, the CCALF picture header control enabling flag is prohibited to be encoded in the picture header syntax.

Application scenario 8: if the ALF sequence control enabling flag of the SPS syntax indicates allowing the current sequence to enable the ALF and the PPS syntax indicates the ALF syntax is present in a slice header, an ALF slice header control enabling flag is encoded in a slice header syntax. Further, if the ALF slice header control enabling flag of the slice header syntax indicates allowing a current slice to enable the ALF and the CCALF sequence control enabling flag of the SPS syntax indicates allowing the current sequence to enable the CCALF, a CCALF slice header control enabling flag is encoded in the slice header syntax.

Illustratively, encoding the ALF slice header control enabling flag in the slice header syntax may include: encoding ALF slice header syntax information in the slice header syntax, where the ALF slice header syntax information includes the ALF slice header control enabling flag. Of course, the ALF slice header syntax information may also include other information relating to the ALF, which is not limited herein.

Illustratively, encoding the CCALF slice header control enabling flag in the slice header syntax may include: encoding CCALF slice header syntax information in the slice header syntax, where the CCALF slice header syntax information includes the CCALF slice header control enabling flag. Of course, the CCALF slice header syntax information may also include other information relating to the CCALF, which is not limited herein.

Application scenario 9: if the ALF sequence control enabling flag of the SPS syntax indicates allowing the current sequence to enable the ALF and the PPS syntax indicates the ALF syntax is present in the slice header, the ALF slice header control enabling flag is encoded in the slice header syntax. Further, if the ALF slice header control enabling flag of the slice header syntax indicates allowing the current slice to enable the ALF and the CCALF sequence control enabling flag of the SPS syntax indicates disallowing the current sequence to enable the CCALF, the CCALF slice header control enabling flag is prohibited to be encoded in the slice header syntax.

Application scenario 10: if the ALF sequence control enabling flag of the SPS syntax indicates allowing the current sequence to enable the ALF and the PPS syntax indicates the ALF syntax is present in the slice header, the ALF slice header control enabling flag is encoded in the slice header syntax. Further, if the ALF slice header control enabling flag of the slice header syntax indicates disallowing the current slice to enable the ALF, the CCALF slice header control enabling flag is prohibited to be encoded in the slice header syntax.

Illustratively, if the ALF slice header control enabling flag of the slice header syntax indicates disallowing the current slice to enable the ALF, regardless of the fact that the CCALF sequence control enabling flag of the SPS syntax indicates the current sequence is allowed or disallowed to enable the CCALF, the CCALF picture header control enabling flag is prohibited to be encoded in the slice header syntax.

Application scenario 11: if the ALF sequence control enabling flag of the SPS syntax indicates allowing the current sequence to enable the ALF and the picture header syntax indicates the ALF syntax is present in the picture header, the ALF picture header control enabling flag is encoded in the picture header syntax. Further, if the ALF picture header control enabling flag of the picture header syntax indicates allowing the current picture to enable the ALF and the CCALF sequence control enabling flag of the SPS syntax indicates allowing the current sequence to enable the CCALF, the CCALF picture header control enabling flag is encoded in the picture header syntax.

Application scenario 12: if the ALF sequence control enabling flag of the SPS syntax indicates allowing the current sequence to enable the ALF and the picture header syntax indicates the ALF syntax is present in the picture header, the ALF picture header control enabling flag is encoded in the picture header syntax. Further, if the ALF picture header control enabling flag of the picture header syntax indicates allowing the current picture to enable the ALF and the CCALF sequence control enabling flag of the SPS syntax indicates disallowing the current sequence to enable the CCALF, the CCALF picture header control enabling flag is prohibited to be encoded in the picture header syntax.

Application scenario 13: if the ALF sequence control enabling flag of the SPS syntax indicates allowing the current sequence to enable the ALF and the picture header syntax indicates the ALF syntax is present in the picture header, the ALF picture header control enabling flag is encoded in the picture header syntax. Further, if the ALF picture header control enabling flag of the picture header syntax indicates disallowing the current picture to enable the ALF, the CCALF picture header control enabling flag is prohibited to be encoded in the picture header syntax.

Illustratively, if the ALF picture header control enabling flag of the picture header syntax indicates disallowing the current picture to enable the ALF, regardless of the fact that the CCALF sequence control enabling flag of the SPS syntax indicates that the current sequence is allowed or disallowed to enable the CCALF, the CCALF picture header control enabling flag is prohibited to be encoded in the picture header syntax.

Application scenario 14: if the ALF sequence control enabling flag of the SPS syntax indicates allowing the current sequence to enable the ALF and the picture header syntax indicates the ALF syntax is present in the slice header, the ALF slice header control enabling flag is encoded in the slice header syntax. Further, if the ALF slice header control enabling flag of the slice header syntax indicates allowing the current slice to enable the ALF, and the CCALF sequence control enabling flag of the SPS syntax indicates allowing the current sequence to enable the CCALF, the CCALF slice header control enabling flag is encoded in the slice header syntax.

Application scenario 15: if the ALF sequence control enabling flag of the SPS syntax indicates allowing the current sequence to enable the ALF, and the picture header syntax indicates the ALF syntax is present in the slice header, the ALF slice header control enabling flag is encoded in the slice header syntax. Further, if the ALF slice header control enabling flag of the slice header syntax indicates allowing the current slice to enable the ALF, and the CCALF sequence control enabling flag of the SPS syntax indicates disallowing the current sequence to enable the CCALF, the CCALF slice header control enabling flag is prohibited to be encoded in the slice header syntax.

Application scenario 16: if the ALF sequence control enabling flag of the SPS syntax indicates allowing the current sequence to enable the ALF, and the picture header syntax indicates the ALF syntax is present in the slice header, the ALF slice header control enabling flag is encoded in the slice header syntax. Further, if the ALF slice header control enabling flag of the slice header syntax indicates disallowing the current slice to enable the ALF, the CCALF slice header control enabling flag is prohibited to be encoded in the slice header syntax.

Illustratively, if the ALF slice header control enabling flag of the slice header syntax indicates disallowing the current slice to enable the ALF, regardless of the fact that the CCALF sequence control enabling flag of the SPS syntax indicates that the current sequence is allowed or disallowed to enable the CCALF, the CCALF picture header control enabling flag is prohibited to be encoded in the slice header syntax.

As can be seen from the above technical solutions, in the embodiments of the present disclosure, higher performance improvement can be achieved with low complexity. The design of the high-level syntax provides flexible use of the CCALF, and improves the loop filtering accuracy of the CCALF, the loop filtering effect of the CCALF, and the encoding performance, such that the reconstruction value of the current processing unit is more approximate to an original pixel. In some embodiments, the current processing unit may be a region where encoding is being performed.

Embodiment 2: an embodiment of the present disclosure provides a decoding method, which may be applied to a decoder. The method may include: if an adaptive loop filter (ALF) sequence control enabling flag of a sequence parameter set (SPS) syntax indicates allowing a current sequence to enable an ALF, decoding a cross-component adaptive loop filter (CCALF) sequence control enabling flag from the SPS syntax, where the CCALF sequence control enabling flag indicates allowing a current sequence to enable a CCALF or the CCALF sequence control enabling flag indicates disallowing the current sequence to enable the CCALF.

Illustratively, if the ALF sequence control enabling flag of the SPS syntax indicates allowing the current sequence to enable ALF and the current sequence has a chroma component, the CCALF sequence control enabling flag is decoded from the SPS syntax.

Illustratively, if the ALF sequence control enabling flag of the SPS syntax indicates disallowing the current sequence to enable the ALF, the CCALF sequence control enabling flag is prohibited to be decoded from the SPS syntax. For example, it is no need to decode the CCALF sequence control enabling flag from the SPS syntax and it is directly determined that disallowing the current sequence to enable the CCALF.

Figure 3:
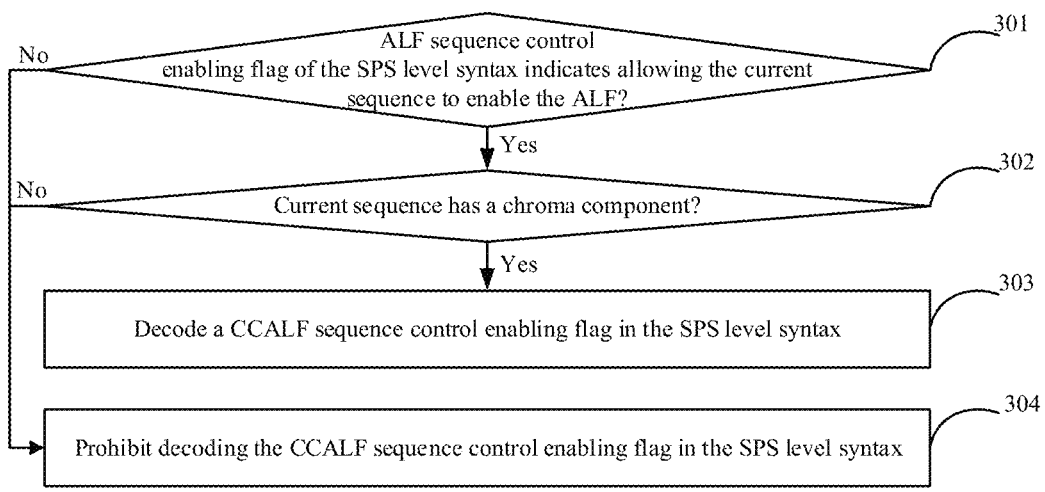
FIG. 3 is a flowchart illustrating a decoding method according to an embodiment of the present disclosure.

FIG. 3 is a flowchart of the decoding method which may be applied to a decoder. The method may include:

At step 301, it is determined whether the ALF sequence control enabling flag of the SPS syntax indicates allowing the current sequence to enable ALF. If yes, step 302 is performed; if not, step 304 is performed.

At step 302, it is determined whether the current sequence has a chroma component.

If yes, step 303 is performed; if not, step 304 is performed.

At step 303, a CCALF sequence control enabling flag is decoded from the SPS syntax.

At step 304, the CCALF sequence control enabling flag is prohibited to be decoded from the SPS syntax.

Illustratively, when the CCALF sequence control enabling flag is decoded from the SPS syntax, if a general constraint information syntax of a CCALF indicates disallowing enabling the CCALF, the CCALF sequence control enabling flag is directly determined as a first value; or, if the general constraint information syntax of the CCALF indicates allowing enabling the CCALF, the CCALF sequence control enabling flag is decoded as a second value from the SPS syntax. For example, the first value indicates disallowing the current sequence to enable the CCALF; the second value indicates allowing the current sequence to enable the CCALF. For example, the first value may be 0 and the second value may be 1; or, the first value may be 1 and the second value may be 0. Of course, the above is only an example.

In combination with several specific application scenarios, the above technical solutions of the embodiments of the present disclosure are described below.

Application scenario 1: if the ALF sequence control enabling flag of the SPS syntax indicates allowing the current sequence to enable ALF, the CCALF sequence control enabling flag is decoded from the SPS syntax.

Application scenario 2: if the ALF sequence control enabling flag of the SPS syntax indicates allowing the current sequence to enable ALF and the current sequence has a chroma component, the CCALF sequence control enabling flag is decoded from the SPS syntax.

Application scenario 3: if the ALF sequence control enabling flag of the SPS syntax indicates disallowing the current sequence to enable the ALF, the CCALF sequence control enabling flag is prohibited to be decoded from the SPS syntax.

Application scenario 4: if the ALF sequence control enabling flag of the SPS syntax indicates allowing the current sequence to enable ALF and the current sequence does not have a chroma component, the CCALF sequence control enabling flag is prohibited to be decoded from the SPS syntax.

Application scenario 5: if the ALF sequence control enabling flag of the SPS syntax indicates allowing the current sequence to enable ALF and a PPS syntax indicates an ALF syntax is present in a picture header, an ALF picture header control enabling flag is decoded from a picture header syntax. Further, if the ALF picture header control enabling flag of the picture header syntax indicates allowing a current picture to enable the ALF and the CCALF sequence control enabling flag of the SPS syntax indicates allowing the current sequence to enable the CCALF, a CCALF picture header control enabling flag is decoded from the picture header syntax.

Application scenario 6: if the ALF sequence control enabling flag of the SPS syntax indicates allowing the current sequence to enable ALF and the PPS syntax indicates the ALF syntax is present in the picture header, the ALF picture header control enabling flag is decoded from the picture header syntax. Further, if the ALF picture header control enabling flag of the picture header syntax indicates allowing the current picture to enable the ALF and the CCALF sequence control enabling flag of the SPS syntax indicates disallowing the current sequence to enable the CCALF, the CCALF picture header control enabling flag is prohibited to be decoded from the picture header syntax.

Application scenario 7: if the ALF sequence control enabling flag of the SPS syntax indicates allowing the current sequence to enable ALF and the PPS syntax indicates the ALF syntax is present in the picture header, the ALF picture header control enabling flag is decoded from the picture header syntax. Further, if the ALF picture header control enabling flag of the picture header syntax indicates disallowing the current picture to enable the ALF, the CCALF picture header control enabling flag is prohibited to be decoded from the picture header syntax.

Illustratively, if the ALF picture header control enabling flag of the picture header syntax indicates disallowing the current picture to enable the ALF, regardless of the fact that the CCALF sequence control enabling flag of the SPS syntax indicates that the current sequence is allowed or disallowed to enable the CCALF, the CCALF picture header control enabling flag is prohibited to be decoded from the picture header syntax.

Application scenario 8: if the ALF sequence control enabling flag of the SPS syntax indicates allowing the current sequence to enable ALF and the PPS syntax indicates the ALF syntax is present in a slice header, an ALF slice header control enabling flag is decoded from a slice header syntax. Further, if the ALF slice header control enabling flag of the slice header syntax indicates allowing a current slice to enable the ALF and the CCALF sequence control enabling flag of the SPS syntax indicates allowing the current sequence to enable the CCALF, a CCALF slice header control enabling flag is decoded from the slice header syntax.

Application scenario 9: if the ALF sequence control enabling flag of the SPS syntax indicates allowing the current sequence to enable ALF and the PPS syntax indicates the ALF syntax is present in the slice header, the ALF slice header control enabling flag is decoded from the slice header syntax. Further, if the ALF slice header control enabling flag of the slice header syntax indicates allowing the current slice to enable the ALF and the CCALF sequence control enabling flag of the SPS syntax indicates disallowing the current sequence to enable the CCALF, the CCALF slice header control enabling flag is prohibited to be decoded from the slice header syntax.

Application scenario 10: if the ALF sequence control enabling flag of the SPS syntax indicates allowing the current sequence to enable ALF and the PPS syntax indicates the ALF syntax is present in the slice header, the ALF slice header control enabling flag is decoded from the slice header syntax. Further, if the ALF slice header control enabling flag of the slice header syntax indicates disallowing the current slice to enable the ALF, the CCALF slice header control enabling flag is prohibited to be decoded from the slice header syntax.

Illustratively, if the ALF slice header control enabling flag of the slice header syntax indicates disallowing the current slice to enable the ALF, regardless of the fact that the CCALF sequence control enabling flag of the SPS syntax indicates that the current sequence is allowed or disallowed to enable the CCALF, the CCALF picture header control enabling flag is prohibited to be decoded from the slice header syntax.

Application scenario 11: if the ALF sequence control enabling flag of the SPS syntax indicates allowing the current sequence to enable ALF and the picture header syntax indicates the ALF syntax is present in the picture header, the ALF picture header control enabling flag is decoded from the picture header syntax. Further, if the ALF picture header control enabling flag of the picture header syntax indicates allowing the current picture to enable the ALF and the CCALF sequence control enabling flag of the SPS syntax indicates allowing the current sequence to enable the CCALF, the CCALF picture header control enabling flag is decoded from the picture header syntax.

Application scenario 12: if the ALF sequence control enabling flag of the SPS syntax indicates allowing the current sequence to enable ALF and the picture header syntax indicates the ALF syntax is present in the picture header, the ALF picture header control enabling flag is decoded from the picture header syntax. Further, if the ALF picture header control enabling flag of the picture header syntax indicates allowing the current picture to enable the ALF and the CCALF sequence control enabling flag of the SPS syntax indicates disallowing the current sequence to enable the CCALF, the CCALF picture header control enabling flag is prohibited to be decoded from the picture header syntax.

Application scenario 13: if the ALF sequence control enabling flag of the SPS syntax indicates allowing the current sequence to enable ALF and the picture header syntax indicates the ALF syntax is present in the picture header, the ALF picture header control enabling flag is decoded from the picture header syntax. Further, if the ALF picture header control enabling flag of the picture header syntax indicates disallowing the current picture to enable the ALF, the CCALF picture header control enabling flag is prohibited to be decoded from the picture header syntax.

Illustratively, if the ALF picture header control enabling flag of the picture header syntax indicates disallowing the current picture to enable the ALF, regardless of the fact that the CCALF sequence control enabling flag of the SPS syntax indicates the current sequence is allowed or disallowed to enable the CCALF, the CCALF picture header control enabling flag is prohibited to be decoded from the picture header syntax.

Application scenario 14: if the ALF sequence control enabling flag of the SPS syntax indicates allowing the current sequence to enable ALF and the picture header syntax indicates the ALF syntax is present in the slice header, the ALF slice header control enabling flag is decoded from the slice header syntax. Further, if the ALF slice header control enabling flag of the slice header syntax indicates allowing the current slice to enable the ALF and the CCALF sequence control enabling flag of the SPS syntax indicates allowing the current sequence to enable the CCALF, the CCALF slice header control enabling flag is decoded from the slice header syntax.

Application scenario 15: if the ALF sequence control enabling flag of the SPS syntax indicates allowing the current sequence to enable ALF and the picture header syntax indicates the ALF syntax is present in the slice header, the ALF slice header control enabling flag is decoded from the slice header syntax. Further, if the ALF slice header control enabling flag of the slice header syntax indicates allowing the current slice to enable the ALF and the CCALF sequence control enabling flag of the SPS syntax indicates disallowing the current sequence to enable the CCALF, the CCALF slice header control enabling flag is prohibited to be decoded from the slice header syntax.

Application scenario 16: if the ALF sequence control enabling flag of the SPS syntax indicates allowing the current sequence to enable ALF and the picture header syntax indicates the ALF syntax is present in the slice header, the ALF slice header control enabling flag is decoded from the slice header syntax. Further, if the ALF slice header control enabling flag of the slice header syntax indicates disallowing the current slice to enable the ALF, the CCALF slice header control enabling flag is prohibited to be decoded from the slice header syntax.

Illustratively, if the ALF slice header control enabling flag of the slice header syntax indicates disallowing the current slice to enable the ALF, regardless of the fact that the CCALF sequence control enabling flag of the SPS syntax indicates that the current sequence is allowed or disallowed to enable the CCALF, the CCALF picture header control enabling flag is prohibited to be decoded from the slice header syntax.

As can be seen from the above technical solutions, in the embodiments of the present disclosure, higher performance improvement can be achieved with low complexity. The design of the high syntax provides flexible use of the CCALF, improves the loop filtering accuracy of the CCALF and the loop filtering effect of the CCALF, and increases the encoding performance, such that the reconstruction value of the current processing unit is more approximate to an original pixel. In some embodiments, the current processing unit may be a region where encoding is being performed.

Embodiment 3: For the embodiment 1 and the embodiment 2, the control of the SPS syntax of the CCALF technology can be referred to Table 1. sps_alf_enabled_flag represents the ALF sequence control enabling flag (also called ALF sequence enabling flag), and sps_ccalf_enabled_flag represents the CCALF sequence control enabling flag (also called CCALF sequence enabling flag). Illustratively, ChromaArrayType represents a luma chroma format of a current sequence, and ChromaArrayType !=0 represents the current sequence has a chroma component. The SPS syntax control shown in FIG. 1 is used to show that, only when the current sequence is allowed to enable the ALF and the current sequence has a chroma component, it is needed to encode sps_ccalf_enabled_flag because the CCALF technology is a subset of the ALF technology and operates for the chroma component.

TABLE 1

| | Descriptor |
|---|---|
| seq_parameter_set_rbsp( ) { | |
| ... | |
| sps_alf_enabled_flag | u(1) |
| if(sps_alf_enabled_flag | |
| &&ChromaArrayType != 0 ) | |
| sps_ccalf_enabled_flag | u(1) |
| ... | |

Embodiment 4: for the embodiment 1 and the embodiment 2, the control of the general constraint information syntax of the CCALF technology can be referred to Table 2. general_constraint_info indicates the general constraint information syntax. When no_ccalf_constraint_flag is 1, it indicates that sps_ccalf_enabled_flag is 0, that is, by using no_ccalf_constraint_flag, it is indicated that CCALF is disallowed to be enabled. When no_ccalf_constraint_flag is 0, it indicates that no such constraint is present, that is, the sps_ccalf_enabled_flag is not limited to be 0, that is, it is not needed to indicate that CCALF is disallowed to be enabled by using no_ccalf_constraint_flag. Of course, the value 0 and the value 1 are only examples.

TABLE 2

| | Descriptor |
|---|---|
| general_constraint_info( ) { | |
| ... | |
| no_alf_constraint_flag | u(1) |
| no_ccalf_constraint_flag | u(1) |

Embodiment 5: for the embodiment 1 and the embodiment 2, the control of the PPS syntax of the CCALF technology can be referred to Table 3. alf_present_in_ph_flag indicates the PPS syntax. alf_present_in_ph_flag is 1, which indicates that a syntax relating to the ALF (including CCALF) is present in the picture header, that is, relevant information is encoded/decoded in the picture header, and the specific syntax can be referred to a picture header syntax table in the following embodiments. alf_present_in_ph_flag is 0, which indicates that a syntax relating to ALF (including CCALF) is present in the slice header, that is, relevant information is encoded/decoded in the slice header, the specific syntax can be referred to the slice header syntax table in the following embodiments. Of course, the above values 0 and 1 are only examples. For example, alf_present_in_ph_flag is 0, which indicates that a syntax relating to the ALF (including CCALF) is present in the picture header, and alf_present_in_ph_flag is 1, which indicates that a syntax relating to the ALF (including the CCALF) is present in the slice header.

TABLE 3

| | Descriptor |
|---|---|
| pic_parameter_set_rbsp( ) { | |
| ... | |
|     alf_present_in_ph_flag | u(1) |
| ... | |

Embodiment 6: for the embodiment 1 and the embodiment 2, the syntaxes relating to the ALF (including CCALF) in the picture header can be referred to Table 4. sps_alf_enabled_flag indicates that the ALF sequence control enabling flag, alf_present_in_ph_flag indicates that the syntax relating to the ALF is present in the picture header or the slice header (present in the picture header in this example), pic_alf_enabled_flag indicates the ALF picture header control enabling flag, sps_ccalf_enabled_flag indicates the CCALF sequence control enabling flag, pic_cross_component_alf_cb_enabled_flag and/or pic_cross_component_alf_cr_enabled_flag indicate the CCALF picture header control enabling flag. For example, the CCALF picture header control enabling flag may include pic_cross_component_alf_cb_enabled_flag and/or pic_cross_component_alf_cr_enabled_flag.

TABLE 4

| | Descriptor |
|---|---|
| picture_header_rbsp( ) { | |
| ... | |
|   if( sps_alf_enabled_flag && | |
|   alf_present_in_ph_flag) { | |
|     pic_alf_enabled_flag | u(1) |
|     if( pic_alf_enabled_flag ) { | |
|       pic_num_alf_aps_ids_luma | u(3) |
|       for( i = 0; i < pic_num_ | |
|     alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|       if( sps_ccalf_enabled_flag ) { | |
|         pic_cross_component_ | u(1) |
|         alf_cb_enabled_flag | |
|         if( pic_cross_component_ | |
|         alf_cb_enabled_flag ) { | |
|           pic_cross_component_ | u(3) |
|           alf_cb_aps_id | |
|         } | |
|         pic_cross_component_ | u(1) |
|         alf_cr_enabled_flag | |
|         if( pic_cross_component_ | |
|         alf_cr_enabled_flag ) { | |
|           pic_cross_component_ | u(3) |
|           alf_cr_aps_id | |
|         } | |

TABLE 4-continued

| | Descriptor |
|---|---|
|       } /* end of sps_ccalf_ | |
|       enabled_flag */ | |
|     } /* end of pic_alf_ | |
|     enabled_flag */ | |
|   } /* end of (sps_alf_enabled_flag | |
|   && alf_present_in_ph_flag) */ | |
| ... | |

As shown in Table 4, when the values of sps_alf_enabled_flag and alf_present_in_ph_flag are 1, the relevant syntax of the ALF in the picture header is encoded/decoded in the picture header. When it is determined to encode/decode the relevant syntax of the ALF in the picture header, whether to encode/decode the relevant syntax of the CCALF in the picture header is determined by determining the value of sps_ccalf_enabled_flag.

Illustratively, the relevant syntaxes of the ALF in the picture header may include but not limited to:
  pic_alf_enabled_flag: indicating whether a block in the picture is allowed to perform ALF;
  pic_num_alf_aps_ids_luma: indicating a number of sets of luma ALF filtering coefficients in the blocks of the picture;
  pic_alf_aps_id_luma[i]: indicating an index value of a i-th set of luma ALF filtering coefficients in the blocks of the picture;
  pic_alf_chroma_idc: indicating whether cb or cr in the picture is allowed to perform ALF;
  pic_alf_aps_id_chroma: indicating an index value of a chroma ALF filtering coefficient in the blocks of the picture; and
  a relevant syntax of the CCALF in the picture header.

Illustratively, the relevant syntaxes of the CCALF in the picture header may include but not limited to:
  pic_cross_component_alf_cb_enabled_flag: indicating whether a block in the picture is allowed to perform CCALF of the cb component;
  pic_cross_component_alf_cb_aps_id: indicating an index value of the filtering coefficient adopted for performing CCALF of the cb component by the block of the picture;
  pic_cross_component_alf_cr_enabled_flag: indicating whether the block in the picture is allowed to perform CCALF of the cr component;
  pic_cross_component_alf_cr_aps_id: indicating an index value of the filtering coefficient adopted for performing CCALF of the cr component by the block of the picture.

Embodiment 7: for the embodiment 1 and the embodiment 2, the syntax relating to the ALF (including CCALF) in the slice header can be referred to Table 5. sps_alf_enabled_flag indicates the ALF sequence control enabling flag, alf_present_in_ph_flag indicates the syntax relating the ALF is present in the picture header or slice header (present in the slice header in this example), slice_alf_enabled_flag indicates the ALF slice header control enabling flag, sps_ccalf_enabled_flag indicates the CCALF sequence control enabling flag, slice_cross_component_alf_cb_enabled_flag and/or slice_cross_component_alf_cr_enabled_flag indicate the CCALF slice header control enabling flag. For example, the CCALF slice header control enabling flag may include: slice_cross_component_alf_cb_enabled_flag and/or slice_cross_component_alf_cr_enabled_flag.

TABLE 5

| | Descriptor |
|---|---|
| slice_header( ) { | |
| ... | |
|   if( sps_alf_enabled_flag && | |
|   !alf_present_in_ph_flag) { | |
|     slice_alf_enabled_flag | u(1) |
|     if( slice_alf_enabled_flag ) { | |
|       slice_num_alf_aps_ids_luma | u(3) |
|       for( i = 0; i < slice_num_ | |
|       alf_aps_ids_luma; i++ ) | |
|         slice_alf_aps_id_luma[ i ] | u(3) |
|       if( ChromaArrayType ! = 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag) { | |
|         slice_cross_component_ | u(1) |
|         alf_cb_enabled_flag | |
|         if( slice_cross_component_ | |
|         alf_cb_enabled_flag ) { | |
|           slice_cross_component_ | u(3) |
|           alf_cb_aps_id | |
|         } | |
|         slice_cross_component_ | u(1) |
|         alf_cr_enabled_flag | |
|         if( slice_cross_component_ | |
|         alf_cr_enabled_flag ) { | |
|           slice_cross_component_ | u(3) |
|           alf_cr_aps_id | |
|         } | |
|     } /* end of sps_ccalf_ | |
|     enabled_flag */ | |
|   } /* end of slice_alf_enabled_flag */ | |
| } /* end of (sps_alf_enabled_flag && | |
| !alf_present_in_ph_flag) */ | |
| ... | |

As shown in Table 5, when sps_alf_enabled_flag is 1 and alf_present_in_ph_flag is 0, the relevant syntax of the ALF in the slice header is encoded/decoded in the slice header. When it is determined to encode/decode the relevant syntax in the slice header, whether to encode/decode the relevant syntax of the CCALF in the slice header is determined by determining the value of sps_ccalf_enabled_flag.

Illustratively, the relevant syntaxes of the ALF in the slice header may include but not limited to:

slice_alf_enabled_flag: indicating whether a block in the slice is allowed to perform ALF;

slice_num_alf_aps_ids_luma: indicating a number of sets of luma ALF filtering coefficients in the blocks of the slice;

slice_alf_aps_id_luma[i]: indicating an index value of a i-th set of luma ALF filtering coefficients in the blocks of the slice;

slice_alf_chroma_idc: indicating whether cb or cr in the picture is allowed to perform ALF;

slice_alf_aps_id_chroma: indicating an index value of a chroma ALF filtering coefficient in the blocks of the slice;

and a relevant syntax of the CCALF in the slice header.

Illustratively, the relevant syntaxes of the CCALF in the slice header may include but not limited to:

slice_cross_component_alf_cb_enabled_flag: indicating whether a block in the slice is allowed to perform ccalf of the cb component;

slice_cross_component_alf_cb_aps_id: indicating an index value of the filtering coefficient adopted for performing ccalf of the cb component by the block of the slice;

slice_cross_component_alf_cr_enabled_flag: indicating whether the block in the slice is allowed to perform ccalf of the cr component;

slice_cross_component_alf_cr_aps_id: indicating an index value of the filtering coefficient adopted for performing ccalf of the cr component by the block of the slice.

Embodiment 8: for the embodiment 1 and the embodiment 2, different form the embodiment 5, in the picture header syntaxes of the CCALF technology, pic_alf_enabled_present_flag indicates the picture header syntax, pic_alf_enabled_present_flag is 1 which indicates that the syntax relating to the ALF (including CCALF) is present in the picture header, that is, relevant information is encoded/decoded in the picture header, the specific syntax can be referred to the picture header syntax table in the following embodiments. pic_alf_enabled_present_flag is 0, which indicates the syntax relating to the ALF (including CCALF) is present in the slice header, that is, relevant information is encoded/decoded in the slice header, the specific syntax can be referred to the slice header syntax table in the following embodiments. Of course, the above values 0 and 1 are only examples. For example, pic_alf_enabled_present_flag is 0, which indicates that the syntax relating to the ALF (including CCALF) is present in the picture header, and pic_alf_enabled_present_flag is 1, which indicates that the syntax relating to the ALF (including CCALF) is present in the slice header.

In the embodiment 8, what is different from the above embodiment 5 is that there is no PPS parameter, alfpresent_inph_flag, which is replaced by the parameter pic_alf_enabled_present_flag for performing encoding in the picture header. Illustratively, pic_alf_enabled_present_flag and alfpresent_inph_flag represent a same meaning.

Embodiment 9: for the embodiment 1 and the embodiment 2, the syntax relating to the ALF (including the CCALF) in the picture header can be referred to Table 6. sps_alf_enabled_flag indicates the ALF sequence control enabling flag, pic_alf_enabled_present_flag indicates that the syntax relating the ALF is present in the picture header or slice header (present in the picture header in this example), pic_alf_enabled_flag indicates the ALF picture header control enabling flag, sps_ccalf_enabled_flag indicates the CCALF sequence control enabling flag, pic_cross_component_alf_cb_enabled_flag and/or pic_cross_component_alf_cr_enabled_flag indicate the CCALF picture header control enabling flag.

TABLE 6

| | Descriptor |
|---|---|
| picture_header_rbsp( ) { | |
| ... | |
|   if( sps_alf_enabled_flag) { | |
|     pic_alf_enabled_present_flag | u(1) |
|     if( pic_alf_enabled_ | |
|     present_flag) { | |
|       pic_alf_enabled_flag | u(1) |
|       if( pic_alf_enabled_flag ) { | |
|         pic_num_alf_aps_ids_luma | u(3) |
|         for( i = 0; i < pic_num_ | |
|         alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|         if( sps_ccalf_enabled_flag ) { | |
|           pic_cross_component_ | u(1) |
|           alf_cb_enabled_flag | |
|           if( pic_cross_component_ | |
|           alf_cb_enabled_flag ) { | |

TABLE 6-continued

| | Descriptor |
|---|---|
|       pic_cross_component_<br>        alf_cb_aps_id<br>      } | u(3) |
|       pic_cross_component_<br>        alf_cr_enabled_flag<br>      if( pic_cross_component_<br>        alf_cr_enabled_flag ) { | u(1) |
|         pic_cross_component_<br>          alf_cr_aps_id<br>      } | u(3) |
|     } /* end of sps_ccalf_<br>      enabled_flag */<br>  } /* end of pic_alf_<br>    enabled_flag */<br>}/* end of pic_alf_<br>  enabled_present_flag */<br>} /* end of sps_alf_enabled_flag */<br>... | |

As shown in Table 6, when values of sps_alf_enabled_flag and pic_alf_enabled_present_flag are 1, the relevant syntax of the ALF in the picture header is encoded/decoded in the picture header. When it is determined to encode/decode the relevant syntax of the ALF in the picture header, whether to encode/decode the relevant syntax of the CCALF in the picture header is determined by determining the value of sps_ccalf_enabled_flag.

Illustratively, the relevant syntax of the ALF in the picture header can be referred to the embodiment 6 and will not be repeated herein.

Illustratively, the relevant syntax of the CCALF in the picture header can be referred to the embodiment 6 and will not be repeated herein.

Embodiment 10: for the embodiment 1 and the embodiment 2, the syntax relating to the ALF (including the CCALF) in the slice header can be referred to Table 7. sps_alf_enabled_flag indicates the ALF sequence control enabling flag, pic_alf_enabled_present_flag indicates the syntax relating the ALF is present in the picture header or slice header (present in the slice header in this example), slice_alf_enabled_flag indicates the ALF slice header control enabling flag, sps_ccalf_enabled_flag indicates the CCALF sequence control enabling flag, slice_cross_component_alf_cb_enabled_flag and/or slice_cross_component_alf_cr_enabled_flag indicate the CCALF slice header control enabling flag.

TABLE 7

| | Descriptor |
|---|---|
| slice_header( ) {<br>  ...<br>  if( sps_alf_enabled_flag &&<br>    !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_<br>        alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag) { | |
|         slice_cross_component_<br>          alf_cb_enabled_flag | u(1) |
|         if( slice_cross_component_<br>          alf_cb_enabled_flag ) { | |

TABLE 7-continued

| | Descriptor |
|---|---|
|           slice_cross_component_<br>            alf_cb_aps_id<br>        } | u(3) |
|         slice_cross_component_<br>          alf_cr_enabled_flag<br>        if( slice_cross_component_<br>          alf_cr_enabled_flag ) { | u(1) |
|           slice_cross_component_<br>            alf_cr_aps_id<br>        } | u(3) |
|       } /* end of sps_ccalf_<br>        enabled_flag */<br>    } /* end of slice_alf_<br>      enabled_flag */<br>} /* end of (sps_alf_enabled_flag<br>&& ! pic_alf_enabled_<br>present_flag)<br>*/<br>... | |

As shown in Table 7, when the value of sps_alf_enabled_flag is 1 and the value of pic_alf_enabled_present_flag is 0, the relevant syntax of the ALF in the slice header is encoded/decoded in the slice header. When it is determined to encode/decode the relevant syntax of the ALF in the slice header, whether to encode/decode the relevant syntax of the CCALF in the slice header is determined by determining the value of sps_ccalf_enabled_flag.

Illustratively, the relevant syntax of the ALF in the slice header can be referred to the embodiment 7 and will not be repeated herein.

Illustratively, the relevant syntax of the CCALF in the slice header can be referred to the embodiment 7 and will not be repeated herein.

In the above embodiments 3 to 10, u(1) indicates one bit is used to perform encoding and decoding, u(n) indicates an unsigned integer of n bits and means n bits are used to perform encoding and decoding. Of course, the u(n) is only an example, which is not limited herein.

Illustratively, the above embodiments 3 to 10 may be combined arbitrarily, for example, the embodiment 3 and the embodiment 4 may be combined; the embodiment 3 and the embodiments 5 to 7 may be combined; the embodiment 3 and the embodiments 8 to 10 may be combined; the embodiments 3 to 7 may be combined; the embodiment 3, the embodiment 4 and the embodiments 8 to 10 may be combined; the embodiment 3, the embodiment 5 and the embodiment 6 may be combined; the embodiment 3, the embodiment 5 and the embodiment 7 may be combined; the embodiment 3, the embodiment 8 and the embodiment 9 may be combined; the embodiment 3, the embodiment 8 and the embodiment 10 may be combined; Of course, the above several combinations are merely illustrative, and any at least two embodiments of the embodiments 3 to 10 can be combined to implement the relevant process.

Figure 4:
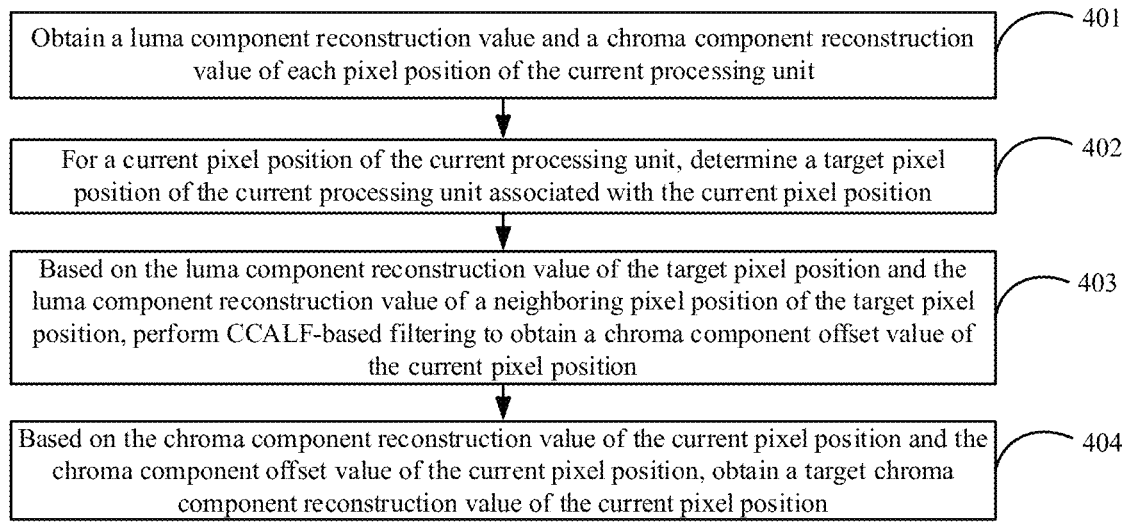
FIG. 4 is a flowchart illustrating an encoding and decoding method according to an embodiment of the present disclosure.

Embodiment 11: based on the embodiments 1 to 10, if it is determined to use the CCALF for the current processing unit based on the CCALF control enabling flag, the encoding and decoding process shown in FIG. 4 can be further performed. Illustratively, if the CCALF sequence control enabling flag corresponding to the current processing unit indicates that the current sequence is allowed to enable the CCALF, it is determined to use the CCALF for the current processing unit; or, if the CCALF picture header control enabling flag corresponding to the current processing unit indicates that the current picture is allowed to enable the CCALF, it is determined to use the CCALF for the current processing unit; or, if the CCALF slice header control enabling flag corresponding to the current processing unit indicates the current slice is allowed to enable the CCALF, it is determined to use the CCALF for the current processing unit; or, if the CCALF sequence control enabling flag corresponding to the current processing unit indicates the current sequence is allowed to enable the CCALF and the CCALF picture header control enabling flag corresponding to the current processing unit indicates the current picture is allowed to enable the CCALF, it is determined to use the CCALF for the current processing unit; or, if the CCALF sequence control enabling flag corresponding to the current processing unit indicates the current sequence is allowed to enable the CCALF and the CCALF slice header control enabling flag corresponding to the current processing unit indicates the current slice is allowed to enable the CCALF, it is determined to use the CCALF for the current processing unit. Of course, the above are merely examples and will not be limited herein. Illustratively, when the CCALF is used for the current processing unit, for an encoder or a decoder, the encoding and decoding process shown in FIG. 4 can be adopted. The encoding and decoding process may include the following steps.

At step 401, a luma component reconstruction value and a chroma component reconstruction value of each pixel position of the current processing unit are obtained.

Illustratively, the loop filtering may include but not limited to deblocking filtering, SAO filtering, ALF filtering, CCALF filtering and the like. During a loop filtering process, at least one of the deblocking filtering, the SAO filtering, the ALF filtering and the CCALF filtering may be performed, and there is no limitation for the sequence of performing the deblocking filtering, the SAO filtering, the ALF filtering and the CCALF filtering and the like.

For example, operations such as the deblocking filtering, the SAO filtering, the ALF filtering and the CCALF filtering may be performed in the following sequence: the deblocking filtering, the SAO filtering, the ALF filtering and the CCALF filtering; or, the deblocking filtering, the SAO filtering, the CCALF filtering and the ALF filtering; or, the deblocking filtering, the CCALF filtering, the SAO filtering, and the ALF filtering; or, the CCALF filtering, the deblocking filtering, the SAO filtering, and the ALF filtering. Of course, the above are only several filtering sequence examples and will not be limited herein.

For another example, operations such as the SAO filtering, the ALF filtering and the CCALF filtering may be performed in the following sequence: the SAO filtering, the ALF filtering and the CCALF filtering; or, the SAO filtering, the CCALF filtering and the ALF filtering; or, the CCALF filtering, the SAO filtering and the ALF filtering. Of course, the above are only several filtering sequence examples and will not be limited herein.

For another example, operations such as the deblocking filtering, the SAO filtering and the CCALF filtering may be performed in the following sequence: the deblocking filtering, the SAO filtering and the CCALF filtering; or, the deblocking filtering, the CCALF filtering and the SAO filtering; or, the CCALF filtering, the deblocking filtering, and the SAO filtering. Of course, the above are only several filtering sequence examples and will not be limited herein.

Of course, the above is an example of performing loop filtering by selecting at least one of the deblocking filtering, the SAO filtering, the ALF filtering and the CCALF filtering, and the loop filtering may also include another type of filtering which is not limited herein.

In this embodiment, for the implementation of the CCALF filtering, the CCALF filtering may be a first filtering manner of the loop filtering, that is, at step 401, the luma component reconstruction value is an unfiltered luma component reconstruction value, and the chroma component reconstruction value is an unfiltered chroma component reconstruction value. Optionally, the CCALF filtering may be performed after the deblocking filtering, that is, at step 401, the luma component reconstruction value is a deblocking-filtered luma component reconstruction value, and the chroma component reconstruction value is a deblocking-filtered chroma component reconstruction value. Optionally, the CCALF filtering may be performed after the SAO filtering, that is, at step 401, the luma component reconstruction value is a SAO-filtered luma component reconstruction value, and the chroma component reconstruction value is a SAO-filtered chroma component reconstruction value. Optionally, the CCALF filtering may be performed after the ALF filtering, that is, at step 401, the luma component reconstruction value is an ALF-filtered luma component reconstruction value, and the chroma component reconstruction value is an ALF-filtered chroma component reconstruction value.

Illustratively, the CCALF filtering and the ALF filtering may be performed at the same time, for example, the CCALF filtering and the ALF filtering may be performed based on the SAO-filtered luma component reconstruction value and the SAO-filtered chroma component reconstruction value after SAO filtering. Optionally, the CCALF filtering and the ALF filtering may be performed based on the deblocking-filtered luma component reconstruction value and the deblocking-filtered chroma component reconstruction value after deblocking filtering. Optionally, the CCALF filtering and the ALF filtering may be performed based on the unfiltered luma component reconstruction value and the unfiltered chroma component reconstruction value.

Regardless of the filtering manners for implementing the loop filtering and the sequences of the filtering manners, during implementation of the CCALF filtering, the luma component reconstruction value and the chroma component reconstruction value of each pixel position of the current processing unit, for example, the SAO-filtered luma component reconstruction value and the SAO-filtered chroma component reconstruction value of each pixel position, can be obtained.

At step 402, for a current pixel position (i.e. a pixel position of the chroma component reconstruction value) of the current processing unit, a target pixel position (i.e. a pixel position of the luma component reconstruction value) of the current processing unit associated with the current pixel position is determined.

Illustratively, the pixel position of the chroma component reconstruction value of the current processing unit may be referred to as the current pixel position and the pixel position of the luma component reconstruction value of the current processing unit may be referred to as the target pixel position. The current pixel position and the target pixel position associated with the current pixel position may be same or different. For example, the current pixel position is a pixel position a1 and the target pixel position associated with the current pixel position is a pixel position a1. For another example, the current pixel position is the pixel position a1 and the target pixel position associated with the current pixel position is a pixel position a2.

Illustratively, if a sampling rate of a picture where the current processing unit is located is a format of 4:2:0, the current pixel position and the target pixel position associated with the current pixel position may be different. If the sampling rate of the picture where the current processing unit is located is a format of 4:4:4, the current pixel position and the target pixel position associated with the current pixel position may be same.

To sum up, based on the sampling rate of the picture where the current processing unit is located, the target pixel position associated with the current pixel position may be determined, and the determination manner is not limited herein. Of course, the above manner is only an example, which is not limited herein as long as the target pixel position associated with the current pixel position can be determined.

Illustratively, if it is required to compensate the chroma component reconstruction value of a pixel position b1 of the current processing unit by using the CCALF, the pixel position b1 is taken as the current pixel position and a target pixel position associated with the current pixel position is determined, for example, the target pixel position is a pixel position b2, and the pixel position b2 and the pixel position b1 may be same or different.

At step 403, based on the luma component reconstruction value of the target pixel position and the luma component reconstruction value of a neighboring pixel position of the target pixel position, CCALF-based filtering is performed to obtain a chroma component offset value of the current pixel position.

Illustratively, a CCALF filtering coefficient set of the current processing unit may be obtained; a CCALF filtering coefficient of the target pixel position is obtained and a CCALF filtering coefficient of the neighboring pixel position of the target pixel position is obtained from the CCALF filtering coefficient set. Then, based on the luma component reconstruction value of the target pixel position, the CCALF filtering coefficient of the target pixel position, the luma component reconstruction value of the neighboring pixel position of the target pixel position and the CCALF filtering coefficient of the neighboring pixel position, CCALF-based filtering is performed to obtain the chroma component offset value of the current pixel position.

Illustratively, the filtering coefficient used for performing filtering by using the CCALF is referred to as the CCALF filtering coefficient.

At step 404, based on the chroma component reconstruction value of the current pixel position and the chroma component offset value of the current pixel position, a target chroma component reconstruction value of the current pixel position is obtained. For example, by compensating the chroma component reconstruction value of the current pixel position using the chroma component offset value of the current pixel position, the target chroma component reconstruction value of the current pixel position is obtained.

The processing procedures of the steps 403 and 404 are described below in combination with several specific cases.

Figure 5A:
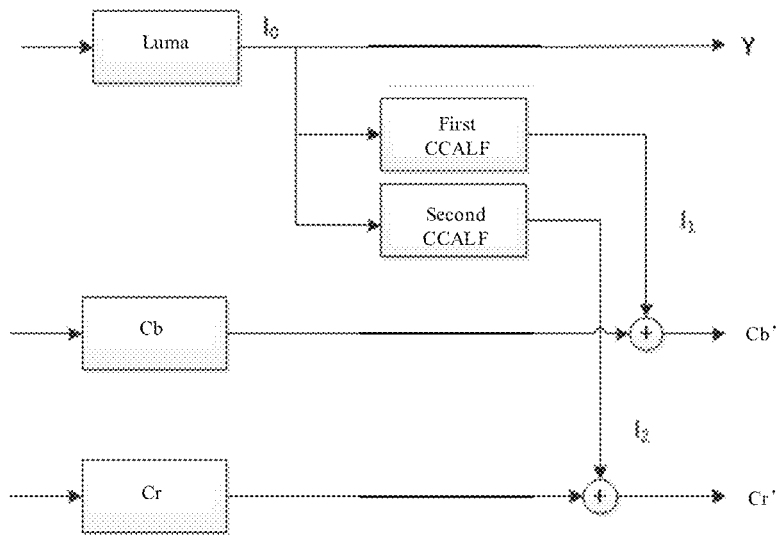
FIGS. 5A to 5D are schematic diagrams illustrating CCALF filtering according to some embodiments of the present disclosure.

In a first case, FIG. 5A is a schematic diagram of CCALF filtering processing. The chroma component reconstruction value includes a first chroma component reconstruction value Cb and a second chroma component reconstruction value Cr, a first CCALF is used to obtain a first chroma component offset value $I_1$ corresponding to the first chroma component reconstruction value Cb, and a second CCALF is used to obtain a second chroma component offset value $I_2$ corresponding to the second chroma component reconstruction value Cr. In the above application scenario, as shown in FIG. 5A, $I_0$ refers to the luma component reconstruction value (i.e. Luma) of the target pixel position and the luma component reconstruction value (i.e. Luma) of the neighboring pixel position of the target pixel position, and the luma component reconstruction value of the target pixel position and the luma component reconstruction value of the neighboring pixel position are input into the first CCALF and the second CCALF.

The first CCALF includes the CCALF filtering coefficient of the target pixel position and the CCALF filtering coefficient of the neighboring pixel position. Therefore, the first CCALF may perform CCALF-based filtering based on the luma component reconstruction value of the target pixel position, the CCALF filtering coefficient of the target pixel position, the luma component reconstruction value of the neighboring pixel position and the CCALF filtering coefficient of the neighboring pixel position to obtain the first chroma component offset value $I_1$ of the current pixel position where the filtering process is not limited herein.

The second CCALF includes the CCALF filtering coefficient of the target pixel position and the CCALF filtering coefficient of the neighboring pixel position. Therefore, the second CCALF may perform CCALF-based filtering based on the luma component reconstruction value of the target pixel position, the CCALF filtering coefficient of the target pixel position, the luma component reconstruction value of the neighboring pixel position and the CCALF filtering coefficient of the neighboring pixel position to obtain the second chroma component offset value $I_2$ of the current pixel position where the filtering process is not limited herein.

Illustratively, the CCALF filtering coefficient of the target pixel position in the first CCALF and the CCALF filtering coefficient of the target pixel position in the second CCALF may be same or different. The CCALF filtering coefficient of the neighboring pixel position in the first CCALF and the CCALF filtering coefficient of the neighboring pixel position in the second CCALF may be same or different. The filtering manner of the first CCALF and the filtering manner of the second CCALF may be same or different.

After the first chroma component offset value $I_1$ of the current pixel position is obtained, a first target chroma component reconstruction value Cb' of the current pixel position may be obtained using the first chroma component reconstruction value Cb and the first chroma component offset value $I_1$. For example, a sum of the first chroma component reconstruction value Cb and the first chroma component offset value $I_1$ is taken as the first target chroma component reconstruction value Cb'.

After the second chroma component offset value $I_2$ of the current pixel position is obtained, a second target chroma component reconstruction value Cr' of the current pixel position may be obtained using the second chroma component reconstruction value Cr and the second chroma component offset value $I_2$. For example, a sum of the second chroma component reconstruction value Cr and the second chroma component offset value $I_2$ is taken as the second target chroma component reconstruction value Cr'.

In a word, the target chroma component reconstruction values of the current pixel position, i.e. Cb' and Cr', can be obtained.

Figure 5B:
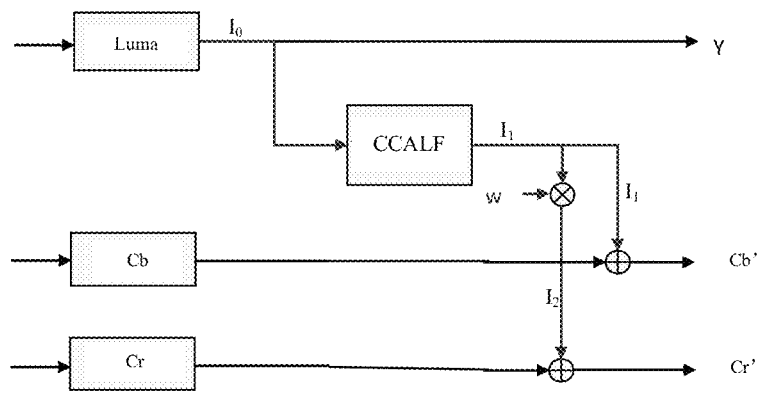

In a second case, FIG. 5B is a schematic diagram of CCALF filtering processing. The chroma component reconstruction value includes a first chroma component reconstruction value Cb and a second chroma component reconstruction value Cr. The CCALF is used to obtain a chroma component offset value which is the first chroma component offset value $I_1$ corresponding to the first chroma component reconstruction value Cb, and obtain the second chroma component offset value $I_2$ corresponding to the second chroma component reconstruction value Cr based on the chroma component offset value.

In the above application scenario, as shown in FIG. 5B, $I_0$ refers to the luma component reconstruction value (i.e. luma) of the target pixel position and the luma component reconstruction value (i.e. luma) of the neighboring pixel position of the target pixel position, and the luma component reconstruction value of the target pixel position and the luma component reconstruction value of the neighboring pixel position may be input into the CCALF (i.e. a joint CCALF).

The CCALF includes the CCALF filtering coefficient of the target pixel position and the CCALF filtering coefficient of the neighboring pixel position. Therefore, the CCALF may perform CCALF-based filtering based on the luma component reconstruction value of the target pixel position, the CCALF filtering coefficient of the target pixel position, the luma component reconstruction value of the neighboring pixel position and the CCALF filtering coefficient of the neighboring pixel position to obtain the first chroma component offset value $I_1$ of the current pixel position, where the filtering process is not limited herein.

Then, the second chroma component offset value $I_2$ of the current pixel position is obtained based on the first chroma component offset value $I_1$. For example, the second chroma component offset value $I_2$ may be the first chroma component offset value $I_1$ times the coefficient w. Illustratively, for an encoder, the coefficient w may be configured arbitrarily and thus not limited herein. For a decoder, the encoder may transmit the coefficient w to the decoder through a bit stream, and the decoder decodes the coefficient w from the bit stream, that is, the coefficient w of the decoder and the coefficient w of the encoder are same.

After the first chroma component offset value $I_1$ of the current pixel position is obtained, the first target chroma component reconstruction value Cb' of the current pixel position may be obtained using the first chroma component reconstruction value Cb and the first chroma component offset value $I_1$. For example, a sum of the first chroma component reconstruction value Cb and the first chroma component offset value $I_1$ is taken as the first target chroma component reconstruction value Cb'.

After the second chroma component offset value $I_2$ of the current pixel position is obtained, the second target chroma component reconstruction value Cr' of the current pixel position may be obtained using the second chroma component reconstruction value Cr and the second chroma component offset value $I_2$. For example, a sum of the second chroma component reconstruction value Cr and the second chroma component offset value $I_2$ is taken as the second target chroma component reconstruction value Cr'.

In a word, the target chroma component reconstruction values of the current pixel position, i.e. Cb' and Cr', can be obtained.

Figure 5C:
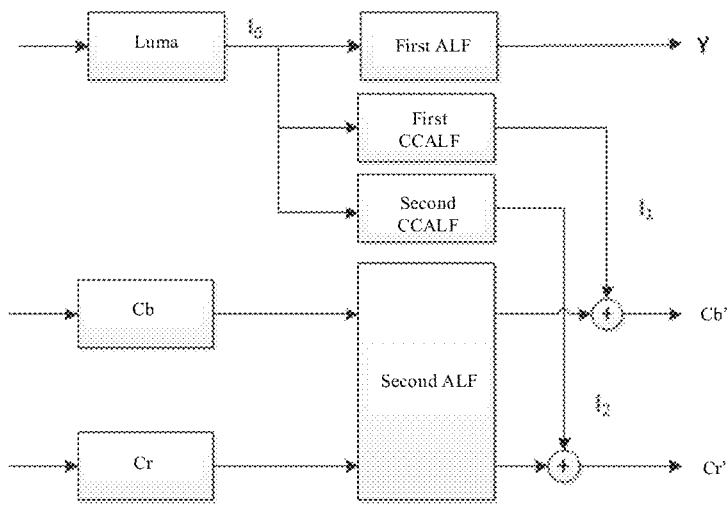

In a third case, FIG. 5C is a schematic diagram of joint filtering of CCALF and ALF. The chroma component reconstruction value includes the first chroma component reconstruction value Cb and the second chroma component reconstruction value Cr. The first CCALF is used to obtain the first chroma component offset value $I_1$ corresponding to the first chroma component reconstruction value Cb, and the second CCALF is used to obtain the second chroma component offset value $I_2$ corresponding to the second chroma component reconstruction value Cr. In the above application scenario, $I_0$ refers to the luma component reconstruction value (i.e. Luma) of the target pixel position and the luma component reconstruction value (i.e. Luma) of the neighboring pixel position of the target pixel position, and the luma component reconstruction value of the target pixel position and the luma component reconstruction value of the neighboring pixel position are input into the first CCALF and the second CCALF.

The first CCALF includes the CCALF filtering coefficient of the target pixel position and the CCALF filtering coefficient of the neighboring pixel position. Therefore, the first CCALF may perform CCALF-based filtering based on the luma component reconstruction value of the target pixel position, the CCALF filtering coefficient of the target pixel position, the luma component reconstruction value of the neighboring pixel position and the CCALF filtering coefficient of the neighboring pixel position to obtain the first chroma component offset value $I_1$ of the current pixel position where the filtering process is not limited herein.

The second CCALF includes the CCALF filtering coefficient of the target pixel position and the CCALF filtering coefficient of the neighboring pixel position. Therefore, the second CCALF may perform CCALF-based filtering based on the luma component reconstruction value of the target pixel position, the CCALF filtering coefficient of the target pixel position, the luma component reconstruction value of the neighboring pixel position and the CCALF filtering coefficient of the neighboring pixel position to obtain the second chroma component offset value $I_2$ of the current pixel position where the filtering process is not limited herein.

In the first case, the luma component reconstruction value of the target pixel position is directly taken as the target luma component reconstruction value of the target pixel position. Different from the first case, in the third case, based on the luma component reconstruction value and an ALF luma filtering coefficient of the target pixel position, ALF-based filtering is performed to obtain the target luma component reconstruction value of the target pixel position.

As shown in FIG. 5C, the luma component reconstruction value of the target pixel position and the luma component reconstruction value of the neighboring pixel position may be input into a first ALF for performing filtering for the luma component reconstruction value. The first ALF may include an ALF luma filtering coefficient of the target pixel position and an ALF luma filtering coefficient of the neighboring pixel position. Therefore, the first ALF may perform ALF-based filtering based on the luma component reconstruction value of the target pixel position, the ALF luma filtering coefficient of the target pixel position, the luma component reconstruction value of the neighboring pixel position and the ALF luma filtering coefficient of the neighboring pixel position to finally obtain the target luma component reconstruction value of the target pixel position.

In the first case, the target chroma component reconstruction value is determined based on the chroma component reconstruction value and the chroma component offset value. Different from the first case, in the third case, based on the chroma component reconstruction value and an ALF chroma filtering coefficient of the current pixel position, ALF-based filtering is performed to obtain a filtered chroma component reconstruction value of the current pixel position. For example, based on the chroma component reconstruction value of the current pixel position, the ALF chroma filtering coefficient of the current pixel position, the chroma component reconstruction value of the neighboring pixel position of the current pixel position and an ALF chroma filtering coefficient of the neighboring pixel position of the current pixel position, ALF-based filtering is performed to obtain the filtered chroma component reconstruction value of the current pixel position. Next, based on the filtered chroma component reconstruction value and the chroma component offset value of the current pixel position, the target chroma component reconstruction value of the current pixel position is obtained.

As shown in FIG. 5C, the first chroma component reconstruction value Cb of the current pixel position and the first chroma component reconstruction value Cb of the neighboring pixel position of the current pixel position are input into the second ALF. The second ALF includes the ALF chroma filtering coefficient of the current pixel position and the ALF chroma filtering coefficient of the neighboring pixel position of the current pixel position. Therefore, the second ALF may perform ALF-based filtering based on the first chroma component reconstruction value Cb of the current pixel position, the ALF chroma filtering coefficient of the current pixel position, the first chroma component reconstruction value Cb of the neighboring pixel position of the current pixel position and the ALF chroma filtering coefficient of the neighboring pixel position of the current pixel position to obtain the filtered first chroma component reconstruction value. Next, a sum of the filtered first chroma component reconstruction value and the first chroma component offset value $I_1$ is taken the first target chroma component reconstruction value Cb'.

The second chroma component reconstruction value Cr of the current pixel position and the second chroma component reconstruction value Cr of the neighboring pixel position of the current pixel position are input into the second ALF. The second ALF includes the ALF chroma filtering coefficient of the current pixel position and the ALF chroma filtering coefficient of the neighboring pixel position of the current pixel position. Therefore, the second ALF may perform ALF-based filtering based on the second chroma component reconstruction value Cr of the current pixel position, the ALF chroma filtering coefficient of the current pixel position, the second chroma component reconstruction value Cr of the neighboring pixel position of the current pixel position and the ALF chroma filtering coefficient of the neighboring pixel position of the current pixel position to obtain the filtered second chroma component reconstruction value. Next, a sum of the filtered second chroma component reconstruction value and the second chroma component offset value $I_2$ is taken the second target chroma component reconstruction value Cr'.

Illustratively, the manner in which the second ALF performs filtering for the first chroma component reconstruction value Cb and the manner in which the second ALF performs filtering for the second chroma component reconstruction value Cr may be same or different, which is not limited herein.

To sum up, the target chroma component reconstruction values of the current pixel position, i.e. the first target chroma component reconstruction value Cb' and the second target chroma component reconstruction value Cr', can be obtained and the target luma component reconstruction value of the target pixel position can be obtained.

Figure 5D:
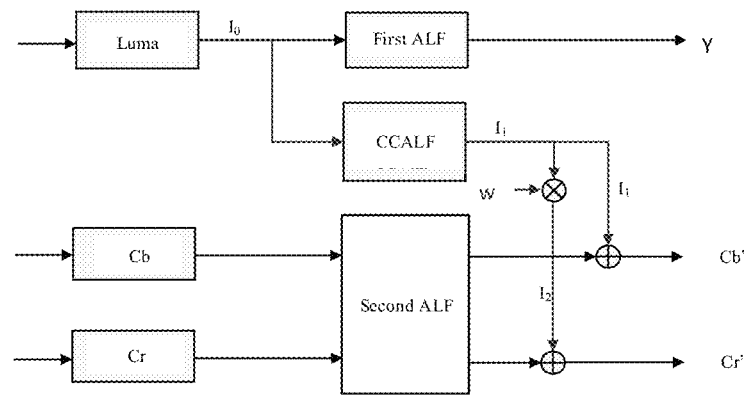

In a fourth case, FIG. 5D is a schematic diagram of joint filtering of CCALF and ALF. The chroma component reconstruction value includes the first chroma component reconstruction value Cb and the second chroma component reconstruction value Cr. The CCALF is used to obtain a chroma component offset value which is the first chroma component offset value $I_1$ corresponding to the first chroma component reconstruction value Cb, and obtain the second chroma component offset value $I_2$ corresponding to the second chroma component reconstruction value Cr based on the chroma component offset value. $I_0$ refers to the luma component reconstruction value of the target pixel position and the luma component reconstruction value of the neighboring pixel position of the target pixel position, and the luma component reconstruction value of the target pixel position and the luma component reconstruction value of the neighboring pixel position are input into the CCALF (i.e. joint CCALF).

The CCALF includes the CCALF filtering coefficient of the target pixel position and the CCALF filtering coefficient of the neighboring pixel position. Therefore, CCALF-based filtering may be performed based on the luma component reconstruction value of the target pixel position, the CCALF filtering coefficient of the target pixel position, the luma component reconstruction value of the neighboring pixel position and the CCALF filtering coefficient of the neighboring pixel position to obtain the first chroma component offset value $I_1$ of the current pixel position. Based on the first chroma component offset value $I_1$, the second chroma component offset value $I_2$ of the current pixel position is obtained, for example, the second chroma component offset value $I_2$ is the first chroma component offset value $I_1$ times the coefficient w.

Different from the second case, in the fourth case, based on the luma component reconstruction value and the ALF luma filtering coefficient of the target pixel position, ALF-based filtering is performed to obtain the target luma component reconstruction value of the target pixel position. As shown in FIG. 5D, the luma component reconstruction value of the target pixel position and the luma component reconstruction value of the neighboring pixel position may be input into the first ALF. The first ALF includes the ALF luma filtering coefficient of the target pixel position and the ALF luma filtering coefficient of the neighboring pixel position. Therefore, the first ALF may perform ALF-based filtering based on the luma component reconstruction value of the target pixel position, the ALF luma filtering coefficient of the target pixel position, the luma component reconstruction value of the neighboring pixel position and the ALF luma filtering coefficient of the neighboring pixel position to obtain the target luma component reconstruction value of the target pixel position, where the filtering process is not limited herein.

In the fourth case, based on the chroma component reconstruction value and the ALF chroma filtering coefficient of the current pixel position, ALF-based filtering is performed to obtain a filtered chroma component reconstruction value of the current pixel position. For example, based on the chroma component reconstruction value of the current pixel position, the ALF chroma filtering coefficient of the current pixel position, the chroma component reconstruction value of the neighboring pixel position of the current pixel position and the ALF chroma filtering coefficient of the neighboring pixel position of the current pixel position, ALF-based filtering is performed to obtain the filtered chroma component reconstruction value of the current pixel position. Next, based on the filtered chroma component reconstruction value and the chroma component offset value of the current pixel position, the target chroma component reconstruction value of the current pixel position is obtained.

As shown in FIG. 5D, the first chroma component reconstruction value Cb of the current pixel position and the first chroma component reconstruction value Cb of the neighboring pixel position of the current pixel position are input into the second ALF. The second ALF includes the ALF chroma filtering coefficient of the current pixel position and the ALF chroma filtering coefficient of the neighboring pixel position of the current pixel position. Therefore, the second ALF may perform ALF-based filtering based on the first chroma component reconstruction value Cb of the current pixel position, the ALF chroma filtering coefficient of the current pixel position, the first chroma component reconstruction value Cb of the neighboring pixel position of the current pixel position and the ALF chroma filtering coefficient of the neighboring pixel position of the current pixel position to obtain the filtered first chroma component reconstruction value. Next, a sum of the filtered first chroma component reconstruction value and the first chroma component offset value $I_1$ is taken as the first target chroma component reconstruction value Cb'.

The second chroma component reconstruction value Cr of the current pixel position and the second chroma component reconstruction value Cr of the neighboring pixel position of the current pixel position are input into the second ALF. The second ALF includes the ALF chroma filtering coefficient of the current pixel position and the ALF chroma filtering coefficient of the neighboring pixel position of the current pixel position. Therefore, the second ALF may perform ALF-based filtering based on the second chroma component reconstruction value Cr of the current pixel position, the ALF chroma filtering coefficient of the current pixel position, the second chroma component reconstruction value Cr of the neighboring pixel position of the current pixel position and the ALF chroma filtering coefficient of the neighboring pixel position of the current pixel position to obtain the filtered second chroma component reconstruction value. Next, a sum of the filtered second chroma component reconstruction value and the second chroma component offset value $I_2$ is taken as the second target chroma component reconstruction value Cr'.

In a word, the target chroma component reconstruction values of the current pixel position, i.e. the first target chroma component reconstruction value Cb' and the second target chroma component reconstruction value Cr', can be obtained and the target luma component reconstruction value of the target pixel position can be obtained.

In the above embodiment, for the third and fourth cases, the CCALF and the ALF coexist, that is, joint filtering of the CCALF and the ALF is performed. For the first and second cases, the CCALF may be independent of the ALF, that is, when the ALF is turned off, the CCALF can be adopted to compensate the chroma component reconstruction value to obtain the target chroma component reconstruction value.

In the above embodiment, the chroma component offset value is obtained by using the CCALF based on the luma component reconstruction value of the target pixel position, and then the chroma component reconstruction value of the current pixel position is compensated using the chroma component offset value to obtain the target chroma component reconstruction value of the current pixel position. Illustratively, when the ALF is turned on, ALF loop filtering operation is performed for at least one pixel position (i.e. the current pixel position), and then the target chroma component reconstruction value of the current pixel position is obtained by adding the ALF-filtered reconstruction value to the chroma component offset value (obtained based on the luma component reconstruction value of the target pixel position).

As can be seen from the above technical solutions, in the embodiments of the present disclosure, CCALF-based filtering is performed based on the luma component reconstruction value of the target pixel position and the luma component reconstruction value of the neighboring pixel position of the target pixel position to obtain the chroma component offset value of the current pixel position, and the target chroma component reconstruction value of the current pixel position is obtained by using the chroma component reconstruction value of the current pixel position and the chroma component offset value of the current pixel position, so as to improve the accuracy of the CCALF loop filtering and the effect of the CCALF loop filtering, thus increasing the encoding performance. In this way, the reconstruction value of the current processing unit is more approximate to the original pixel.

Embodiment 12: in the embodiment 11, it is required to perform CCALF-based filtering based on the CCALF filtering coefficient of the target pixel position and the CCALF filtering coefficient of the neighboring pixel position. In order to obtain the CCALF filtering coefficient of the target pixel position and the CCALF filtering coefficient of the neighboring pixel position, the following manner can be adopted.

At step s11, both the encoder and the decoder maintain a CCALF filtering coefficient list. The CCALF filtering coefficient list may include at least one CCALF filtering coefficient set. For each CCALF filtering coefficient set in the CCALF filtering coefficient list, the CCALF filtering coefficient set may include a plurality of CCALF filtering coefficients.

For each CCALF filtering coefficient set, the CCALF filtering coefficient set may include the CCALF filtering coefficient of the target pixel position (i.e. the CCALF filtering coefficient of one target pixel position) and the CCALF filtering coefficient of the neighboring pixel position of the target pixel position (e.g. the CCALF filtering coefficients of a plurality of neighboring pixel positions). In this case, the CCALF filtering coefficient of the target pixel position and the CCALF filtering coefficient of the neighboring pixel position may be obtained from the CCALF filtering coefficient set.

For each CCALF filtering coefficient set, the CCALF filtering coefficient set may include the CCALF filtering coefficient of the neighboring pixel position of the target pixel position (e.g. the CCALF filtering coefficients of a plurality of neighboring pixel positions) but does not include the CCALF filtering coefficient of the target pixel position. In this case, the CCALF filtering coefficient of the neighboring pixel position may be obtained from the CCALF filtering coefficient set. For the CCALF filtering coefficient of the target pixel position, a preset value may be taken as the CCALF filtering coefficient of the target pixel position or the CCALF filtering coefficient of the target pixel position may be obtained in another way, which is not limited herein as long as the CCALF filtering coefficient set does not include the CCALF filtering coefficient of the target pixel position.

In a possible implementation, the encoder and the decoder may pre-configure a CCALF filtering coefficient list as long as the CCALF filtering coefficient list of the encoder and the CCALF filtering coefficient list of the decoder are same. For example, a CCALF filtering coefficient list A is pre-configured at the encoder and also configured at the decoder.

In another possible implementation, the encoder may obtain the CCALF filtering coefficient list in any way as long as the CCALF filtering coefficient list can be obtained. Next, the encoder sends the CCALF filtering coefficient list to the decoder through a bit stream and the decoder decodes the CCALF filtering coefficient list from the bit stream.

Illustratively, the CCALF filtering coefficient list may be a frame-level CCALF filtering coefficient list, that is, a same frame-level CCALF filtering coefficient list is shared for all picture blocks of one frame. Based on this, the encoder carries the frame-level CCALF filtering coefficient list through a bit stream, and the decoder decodes the frame-level CCALF filtering coefficient list from the bit stream. After obtaining the CCALF filtering coefficient list, the decoder may store the CCALF filtering coefficient list locally.

Illustratively, the CCALF filtering coefficient list may be a sequence parameter set(SPS)-level CCALF filtering coefficient list, that is, a same SPS-level CCALF filtering coefficient list is shared for all picture blocks of a plurality of frames. Based on this, the encoder carries the sequence-level CCALF filtering coefficient list through a bit stream, and the decoder decodes the SPS-level CCALF filtering coefficient list from the bit stream. After obtaining the CCALF filtering coefficient list, the decoder may store the CCALF filtering coefficient list locally.

Illustratively, the CCALF filtering coefficient list may be an adaptive parameter set (APS)-level CCALF filtering coefficient list, that is, a same APS-level CCALF filtering coefficient list is shared for all picture blocks of a plurality of frames. Based on this, the encoder carries the APS-level CCALF filtering coefficient list through a bit stream, and the decoder decodes the APS-level CCALF filtering coefficient list from the bit stream. After obtaining the APS-level CCALF filtering coefficient list, the decoder may store the CCALF filtering coefficient list locally.

For the case of the APS-level CCALF filtering coefficient list, there may be at least one APS-level CCALF filtering coefficient list, and one APS-level CCALF filtering coefficient list is selected from the at least one APS-level CCALF filtering coefficient list as a picture-level or slice-level CCALF filtering coefficient list.

Of course, the above manner is only an example, which is not limited herein. For example, the CCALF filtering coefficient list may also be a picture parameter set (PPS)-level CCALF filtering coefficient list or a slice-level (slice or tile) CCALF filtering coefficient list.

The CCALF filtering coefficient list may be at any level, as long as the encoder and the decoder maintain a CCALF filtering coefficient list and the CCALF filtering coefficient list of the encoder and the CCALF filtering coefficient list of the decoder are same.

At step s12, the CCALF filtering coefficient set of the current processing unit is obtained. For example, for the encoder and the decoder, the CCALF filtering coefficient set of the current processing unit is obtained from the CCALF filtering coefficient list of the current processing unit.

Illustratively, if the CCALF filtering coefficient list is a frame-level CCALF filtering coefficient list, the CCALF filtering coefficient list of the current processing unit may be determined based on the frame-level CCALF filtering coefficient list. For example, the CCALF filtering coefficient list of the frame where the current processing unit is located is determined as the CCALF filtering coefficient list of the current processing unit.

Illustratively, if the CCALF filtering coefficient list is an SPS-level CCALF filtering coefficient list, the CCALF filtering coefficient list of the current processing unit may be determined based on the SPS-level CCALF filtering coefficient list. For example, the CCALF filtering coefficient list of the SPS where the current processing unit is located is determined as the CCALF filtering coefficient list of the current processing unit.

If the CCALF filtering coefficient list is an APS-level CCALF filtering coefficient list, the CCALF filtering coefficient list of the current processing unit may be determined based on the APS-level CCALF filtering coefficient list. For example, the CCALF filtering coefficient list of the APS where the current processing unit is located is determined as the CCALF filtering coefficient list of the current processing unit.

Illustratively, for the encoder, whether the current processing unit uses the CCALF filtering operation is determined, and the determination manner is not limited herein. If the current processing unit uses the CCALF filtering operation, the CCALF filtering coefficient set of the current processing unit is obtained from the CCALF filtering coefficient list of the current processing unit. For example, for each CCALF filtering coefficient set of the CCALF filtering coefficient list, the encoder may determine a rate distortion cost value corresponding to the CCALF filtering coefficient set, where the determination manner is not limited herein. The CCALF filtering coefficient set corresponding to a minimum rate distortion cost value is taken as the CCALF filtering coefficient set of the current processing unit. When the encoder sends an encoded bit stream for the current processing unit to the decoder, the encoded bit stream may carry indication information of the CCALF filtering coefficient set. For example, if the current processing unit does not use the CCALF filtering operation, the indication information of the CCALF filtering coefficient set is used to indicate the current processing unit does not use the CCALF filtering operation. Alternatively, if the current processing unit uses the CCALF filtering operation, the indication information of the CCALF filtering coefficient set is used to indicate the current processing unit uses the CCALF filtering operation and also indicate an index value of the CCALF filtering coefficient set of the current processing unit in the CCALF filtering coefficient list. For the decoder, an encoded bit stream of the current processing unit is obtained and the indication information of the CCALF filtering coefficient set is obtained from the encoded bit stream. If the indication information is used to indicate the current processing unit does not use the CCALF filtering operation, the decoder does not need to perform the CCALF filtering operation. If the indication information is used to indicate the current processing unit uses the CCALF filtering operation and also indicate an index value of the CCALF filtering coefficient set of the current processing unit in the CCALF filtering coefficient list, the decoder obtains the CCALF filtering coefficient set of the current processing unit from the CCALF filtering coefficient list of the current processing unit. For example, the CCALF filtering coefficient set corresponding to the index value in the CCALF filtering coefficient list is taken as the CCALF filtering coefficient set of the current processing unit. Next, the decoder performs the CCALF filtering operation based on the CCALF filtering coefficient set of the current processing unit.

At step s13, the CCALF filtering coefficient of the target pixel position is obtained and the CCALF filtering coefficient of the neighboring pixel position of the target pixel position is obtained from the CCALF filtering coefficient set of the current processing unit. For example, if the CCALF filtering coefficient set includes the CCALF filtering coefficient of the target pixel position, the CCALF filtering coefficient of the target pixel position is obtained from the CCALF filtering coefficient set of the current processing unit. Optionally, if the CCALF filtering coefficient set does not include the CCALF filtering coefficient of the target pixel position, a preset value is taken as the CCALF filtering coefficient of the target pixel position, or the CCALF filtering coefficient of the target pixel position is obtained in another way, which is not limited herein as long as the CCALF filtering coefficient of the target pixel position can be obtained. Illustratively, after the CCALF filtering coefficient of the target pixel position and the CCALF filtering coefficient of the neighboring pixel position are obtained, CCALF-based filtering is performed based on the luma component reconstruction value of the target pixel position, the CCALF filtering coefficient of the target pixel position, the luma component reconstruction value of the neighboring pixel position, and the CCALF filtering coefficient of the neighboring pixel position, so as to obtain the chroma component offset value of the current pixel position, where the specific implementation can be referred to the above embodiments.

In the above embodiment, when the CCALF filtering coefficient list (e.g. the frame-level CCALF filtering coefficient list, or the SPS-level CCALF filtering coefficient list or the APS-level CCALF filtering coefficient list) is transmitted through a bit stream, the CCALF filtering coefficient list includes at least one CCALF filtering coefficient set. Each CCALF filtering coefficient set may include at least one CCALF filtering coefficient. Illustratively, for each CCALF filtering coefficient in the CCALF filtering coefficient set: the value of the CCALF filtering coefficient is 0, or the N-th power of 2, or the opposite number of the N-th power of 2, where N is 0 or a positive integer less than a first threshold; and/or, the CCALF filtering coefficient is between a second threshold and a third threshold.

For example, in order to reduce multiplication operation in a filtering process, shift is used to replace multiplication operation and the CCALF filtering coefficient may be limited to 0, or the N-th power of 2 or the opposite number of the N-th power of 2. The first threshold may be configured based on experiences, which is not limited herein. For example, the first threshold may be 5, 6 and the like. Based on this, the CCALF filtering coefficient may be 0, 1, 2, 4, 8, 16, 32, 64, −1, −2, −4, −8, −16, −32, −64 and the like. To sum up, each CCALF filtering coefficient in the CCALF filtering coefficient set needs to satisfy the above limitation relationship.

For another example, the CCALF filtering coefficient is limited between the second threshold and the third threshold, and the second threshold and the third threshold may be configured based on experiences, which is not limited herein. For example, the second threshold may be a negative value, and the third threshold may be a positive value, for example the second threshold may be −64, and the third threshold may be 64. In this way, the CCALF filtering coefficient can be limited to be within the interval of [−64, 64]. For example, the second threshold may be −63, and the third threshold may be 63, and in this way, the CCALF filtering coefficient can be limited to be within the interval of [−63, 63]. For example, the second threshold may be −127, and third threshold may be 127, and in this way, the CCALF filtering coefficient can be limited to be within the interval of [−127, 127]. For example, the second threshold may be −32, and the third threshold may be 32, and thus the CCALF filtering coefficient can be limited to be within the interval of [−32, 32]. Of course, the above are only several examples, which is not limited herein. To sum up, each CCALF filtering coefficient in the CCALF filtering coefficient set needs to satisfy the above limitation relationship.

For another example, the CCALF filtering coefficient is limited to 0, the N-th power of 2, or the opposite number of the N-th power of 2, where N is 0 or a positive integer less than the first threshold, and the CCALF filtering coefficient is limited to be between the second threshold and the third threshold. For example, the first threshold is 6, the second threshold is −63, and the third threshold may be 63, and thus the CCALF filtering coefficient may be 0, 1, 2, 4, 8, 16, 32, −1, −2, −4, −8, −16, −32, that is, each CCALF filtering coefficient needs to satisfy the above limitation relationship.

In the above embodiment, when the CCALF filtering coefficient list is transmitted through a bit stream, the CCALF filtering coefficient list includes at least one CCALF filtering coefficient set, and each CCALF filtering coefficient set includes at least one CCALF filtering coefficient. When each CCALF filtering coefficient in the CCALF filtering coefficient set is transmitted by a bit stream, a mapping value (e.g. when the CCALF filtering coefficient is the N-th power of 2, the mapping value is N+1) of the CCALF filtering coefficient is encoded by using fixed-length code encoding, and the mapping value of the CCALF filtering coefficient is decoded by using fixed-length code decoding. For example, the encoder encodes the mapping value of the CCALF filtering coefficient by using fixed-length code encoding and adds the encoded mapping value to the bit stream. In this way, bit encoding overhead is fixed, thereby reducing bit overhead. The decoder decodes the mapping value of the CCALF filtering coefficient by using fixed-length code decoding to obtain a decoded mapping value and converts the mapping value into the CCALF filtering coefficient, for example, converts the mapping value N+1 into the N-th power of 2, where the N-th power of 2 is the CCALF filtering coefficient.

In the above embodiment, when the CCALF filtering coefficient list is transmitted through a bit stream, the CCALF filtering coefficient list includes at least one CCALF filtering coefficient set, and each CCALF filtering coefficient set includes at least one CCALF filtering coefficient. For each CCALF filtering coefficient in the CCALF filtering coefficient set: if the CCALF filtering coefficient is not 0, the bit stream may include indication information r1 and indication information r2 of the CCALF filtering coefficient, where the indication information r1 is used to indicate an amplitude of the CCALF filtering coefficient and the indication information r2 is used to indicate a sign bit of the CCALF filtering coefficient.

For example, for the encoder, when it is required to transmit the CCALF filtering coefficient, if the CCALF filtering coefficient is non-zero, the sign bit of the CCALF filtering coefficient and the amplitude of the CCALF filtering coefficient are separated. For example, for the CCALF filtering coefficient −32, the sign bit of the CCALF filtering coefficient is negative (−) and the amplitude of the CCALF filtering coefficient is 32; for the CCALF filtering coefficient 32, the sign bit of the CCALF filtering coefficient is positive (+), and the amplitude of the CCALF filtering coefficient is 32. Based on this, the encoder adds the indication information r1 and the indication information r2 to the bit stream, where the indication information r1 is used to indicate the amplitude of the CCALF filtering coefficient (e.g. 32) and the indication information r2 may be one bit for indicating a positive or negative sign bit.

For the decoder, when the CCALF filtering coefficient is decoded, the indication information r1 is firstly decoded from the bit stream and the amplitude (e.g. 32) of the CCALF filtering coefficient is determined based on the indication information r1. When the amplitude of the CCALF filtering coefficient is nonzero, the indication information r2 is then decoded from the bit stream and the sign bit of the CCALF filtering coefficient is determined based on the indication information r2. Next, the amplitude of the CCALF filtering coefficient and the sign bit of the CCALF filtering coefficient are formed into the CCALF filtering coefficient.

To sum up, for the encoder, the encoding manner of the CCALF filtering coefficient may include the followings: when the CCALF filtering coefficient is the N-th power of 2 (or the opposite number of the N-th power of 2), the amplitude of the CCALF filtering coefficient is mapped to N+1, for example, when the CCALF filtering coefficient is 2 to the power of 3 (or the opposite number of 2 to the power of 3), the mapping value is 4; next, the mapping value 4 is encoded by using fixed-length code encoding, and the length of the fixed-length code is dependent on the maximum range of the CCALF filtering coefficient, for example, when N is 7 at most, the length of the fixed-length code is to be encoded with M bits, where M for example, is 3. Furthermore, one bit is added to the bit stream to indicate the positive or negative sign bit of the CCALF filtering coefficient. Illustratively, when the CCALF filtering coefficient is 0, it is not required to perform a mapping process and the CCALF filtering coefficient is directly encoded in the bit stream.

For the decoder, the decoding manner of the CCALF filtering coefficient may include the followings: when the CCALF filtering coefficient is decoded from the bit stream, the CCALF filtering coefficient in the bit stream is decoded by using fixed-length code decoding to obtain a mapping value (i.e. N+1), and then, the mapping value is converted into the N-th power of 2, for example, when the mapping value is 4, the mapping value is converted into 2 to the power of 3, i.e. 8; then, a positive or negative sign bit of the CCALF filtering coefficient is decoded from the bit stream; if it is a positive sign bit, the CCALF filtering coefficient is 8, and if it is a negative sign bit, the CCALF filtering coefficient is −8; till now, the CCALF filtering coefficient is obtained.

Furthermore, if the decoder decodes 0 from the bit stream, the value of the CCALF filtering coefficient may be directly determined as 0.

To sum up, the parameter value (i.e. the value of the CCALF filtering coefficient) may be only the N-th power of 2 (such multiplication can be implemented by shift, and the hardware implementation complexity is low). Specifically, the parameter value may be only one of the following coefficient values: {−64, −32, −16, −8, −4, −2, −1, 0, 1, 2, 4, 8, 16, 32, 64}. In order to save the coefficient encoding cost, one-to-one correspondence indexing is performed using {−7, −6, −5, −4, −3, −2, −1, 0, 1, 2, 3, 4, 5, 6, 7} to realize that the index value, that is, −7 indicates −64, the index value 0 indicates 0, and the index value 7 indicates 64. In order to represent the index value, an absolute value is encoded using fixed-length 3 bits and one flag code indicates the sign bit. The specific process can be referred to the above embodiments.

Embodiment 13: in the embodiments 11 and 12, the CCALF filtering coefficient set may be involved, where the CCALF filtering coefficient set includes the CCALF filtering coefficient of the target pixel position and the CCALF filtering coefficient of the neighboring pixel position of the target pixel position, or the CCALF filtering coefficient set includes the CCALF filtering coefficient of the neighboring pixel position of the target pixel position. The CCALF filtering coefficient in the CCALF filtering coefficient set will be described below in combination with several specific cases.

Figure 6A:
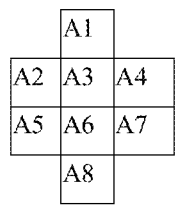
FIGS. 6A to 6N are schematic diagrams illustrating a neighboring pixel position according to some embodiments of the present disclosure.

In a first case, FIG. 6A is a schematic diagram of a neighboring pixel position of a target pixel position. A pixel position A3 is the target pixel position, and the CCALF filtering coefficient set includes: the CCALF filtering coefficient of the exactly-upper pixel position (pixel position A1) of the target pixel position, the CCALF filtering coefficient of the left pixel position (pixel position A2) of the target pixel position, the CCALF filtering coefficient of the right pixel position (pixel position A4) of the target pixel position, the CCALF filtering coefficient of the exactly-lower pixel position (pixel position A6) of the target pixel position, the CCALF filtering coefficient of the left lower pixel position (pixel position A5) of the target pixel position, the CCALF filtering coefficient of the right lower pixel position (pixel position A7) of the target pixel position, and the CCALF filtering coefficient of the exactly-lower second row of pixel position (pixel position A8) of the target pixel position.

Illustratively, as shown in FIG. 6A, it is a shape of 3×2 and each chroma component has four filtering coefficient values at most. Since there are two chroma components at most, there are 8 CCALF filtering coefficient values at most.

Figure 6B:
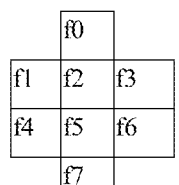

In a possible implementation, as shown in FIG. 6B, the CCALF filtering coefficient of the pixel position A1 is f0, the CCALF filtering coefficient of the pixel position A2 is f1, the CCALF filtering coefficient of the pixel position A3 is f2, the CCALF filtering coefficient of the pixel position A4 is f3, the CCALF filtering coefficient of the pixel position A5 is f4, the CCALF filtering coefficient of the pixel position A6 is f5, the CCALF filtering coefficient of the pixel position A7 is f6, the CCALF filtering coefficient of the pixel position A8 is f7. To sum up, the CCALF filtering coefficients of various pixel positions are different, f2 is the CCALF filtering coefficient of the target pixel position, and f0, f1, f3, f4, f5, f6 and f7 are CCALF filtering coefficients of the neighboring pixel positions respectively.

Figure 6C:
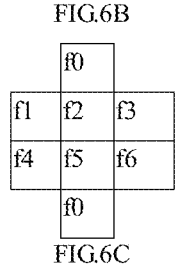

In another possible implementation, as shown in FIG. 6C, the CCALF filtering coefficient of the pixel position A1 is f0, the CCALF filtering coefficient of the pixel position A2 is f1, the CCALF filtering coefficient of the pixel position A3 is f2, the CCALF filtering coefficient of the pixel position A4 is f3, the CCALF filtering coefficient of the pixel position A5 is f4, the CCALF filtering coefficient of the pixel position A6 is f5, the CCALF filtering coefficient of the pixel position A7 is f6, the CCALF filtering coefficient of the pixel position A8 is f0. To sum up, f2 is the CCALF filtering coefficient of the target pixel position, f0, f1, f3, f4, f5, f6 are the CCALF filtering coefficients of the neighboring pixel positions respectively, and the CCALF filtering coefficient f0 of the pixel position A1 (the exactly-upper pixel position) and the CCALF filtering coefficient f0 of the pixel position A8 (the exactly-lower second row of pixel position) may be same.

In the above manner, the CCALF filtering coefficients of the pixel position A1 and the pixel position A8 are set to be same so as to simplify the design of the CCALF filtering coefficient and reduce the number of the CCALF filtering coefficients in the CCALF filtering coefficient set.

Figure 6D:
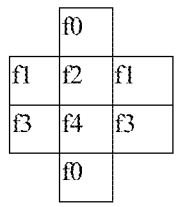

In another possible implementation, as shown in FIG. 6D, the CCALF filtering coefficient of the pixel position A1 is f0, the CCALF filtering coefficient of the pixel position A2 is f1, the CCALF filtering coefficient of the pixel position A3 is f2, the CCALF filtering coefficient of the pixel position A4 is f1, the CCALF filtering coefficient of the pixel position A5 is f3, the CCALF filtering coefficient of the pixel position A6 is f4, the CCALF filtering coefficient of the pixel position A7 is f3, the CCALF filtering coefficient of the pixel position A8 is f0. f2 is the CCALF filtering coefficient of the target pixel position, f0, f1, f3, f4 are the CCALF filtering coefficients of the neighboring pixel positions respectively. The CCALF filtering coefficient f0 of the pixel position A1 (i.e. the exactly-upper pixel position) and the CCALF filtering coefficient f0 of the pixel position A8 (i.e. the exactly-lower pixel second row of position) are same. The CCALF filtering coefficient f1 of the pixel position A2 (i.e. the left pixel position) and the CCALF filtering coefficient f1 of the pixel position A4 (i.e. the right pixel position) are same. The CCALF filtering coefficient f3 of the pixel position A5 (i.e. the left lower pixel position) and the CCALF filtering coefficient f3 of the pixel position A7 (i.e. the right lower pixel position) are same. In the above manner, the CCALF filtering coefficients of different pixel positions are set to be same so as to simplify the design of the CCALF filtering coefficient and reduce the number of the CCALF filtering coefficients in the CCALF filtering coefficient set.

Figure 6E:
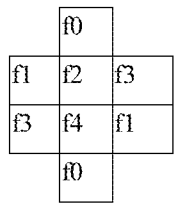

In another possible implementation, as shown in FIG. 6E, the CCALF filtering coefficient of the pixel position A1 is f0, the CCALF filtering coefficient of the pixel position A2 is f1, the CCALF filtering coefficient of the pixel position A3 is f2, the CCALF filtering coefficient of the pixel position A4 is f3, the CCALF filtering coefficient of the pixel position A5 is f3, the CCALF filtering coefficient of the pixel position A6 is f4, the CCALF filtering coefficient of the pixel position A7 is f1, the CCALF filtering coefficient of the pixel position A8 is f0. f2 is the CCALF filtering coefficient of the target pixel position, f0, f1, f3, f4 are the CCALF filtering coefficients of the neighboring pixel positions respectively. The CCALF filtering coefficient f0 of the pixel position A1 (i.e. the exactly-upper pixel position) and the CCALF filtering coefficient f0 of the pixel position A8 (i.e. the exactly-lower second row of pixel position) are same. The CCALF filtering coefficient f1 of the pixel position A2 (i.e. the left pixel position) and the CCALF filtering coefficient f1 of the pixel position A7 (i.e. the right lower pixel position) are same. The CCALF filtering coefficient f3 of the pixel position A4 (i.e. the right pixel position) and the CCALF filtering coefficient f3 of the pixel position A5 (i.e. the left lower pixel position) are same. In the above manner, the CCALF filtering coefficients of different pixel positions are set to be same so as to simplify the design of the CCALF filtering coefficient and reduce the number of the CCALF filtering coefficients in the CCALF filtering coefficient set.

Of course, the above several manners are only examples and the CCALF filtering coefficients of any pixel positions can be set to be same, for example, as long as the same CCALF filtering coefficients have symmetry (e.g. axial symmetry or central symmetry), which is not limited herein.

Figure 6F:
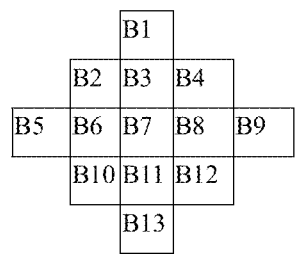

In a second case, FIG. 6F is a schematic diagram of a neighboring pixel position of a target pixel position. A pixel position B7 is the target pixel position, and the CCALF filtering coefficient set includes: the CCALF filtering coefficient of the exactly-upper second row of pixel position (pixel position B1) of the target pixel position, the CCALF filtering coefficient of the left upper pixel position (pixel position B2) of the target pixel position, the CCALF filtering coefficient of the exactly-upper pixel position (pixel position B3) of the target pixel position, the CCALF filtering coefficient of the right upper pixel position (pixel position B4) of the target pixel position, the CCALF filtering coefficient of the left pixel position of second column (pixel position B5) of the target pixel position, the CCALF filtering coefficient of the left pixel position (pixel position B6) of the target pixel position, the CCALF filtering coefficient of the right pixel position (pixel position B8) of the target pixel position, the CCALF filtering coefficient of the right pixel position of second column (pixel position B9) of the target pixel position, the CCALF filtering coefficient of the left lower pixel position (pixel position B10) of the target pixel position, the CCALF filtering coefficient of the exactly-lower pixel position (pixel position B11) of the target pixel position, the CCALF filtering coefficient of the right lower pixel position (pixel position B12) of the target pixel position, the CCALF filtering coefficient of the exactly-lower second row of pixel position (pixel position B13) of the target pixel position.

Figure 6G:
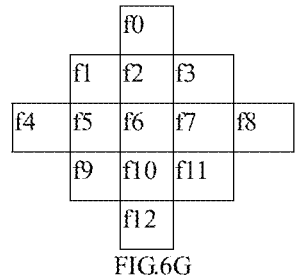

In a possible implementation, as shown in FIG. 6G, the CCALF filtering coefficient of the pixel position B1 is f0, the CCALF filtering coefficient of the pixel position B2 is f1, the CCALF filtering coefficient of the pixel position B3 is f2, the CCALF filtering coefficient of the pixel position B4 is f3, the CCALF filtering coefficient of the pixel position B5 is f4, the CCALF filtering coefficient of the pixel position B6 is f5, the CCALF filtering coefficient of the pixel position B7 is f6, the CCALF filtering coefficient of the pixel position B8 is f7, the CCALF filtering coefficient of the pixel position B9 is f8, the CCALF filtering coefficient of the pixel position B10 is f9, the CCALF filtering coefficient of the pixel position B11 is f10, the CCALF filtering coefficient of the pixel position B12 is f11, the CCALF filtering coefficient of the pixel position B13 is f12. To sum up, the CCALF filtering coefficients of various pixel positions are different, f6 is the CCALF filtering coefficient of the target pixel position, f0-f5 and f7-f12 are the CCALF filtering coefficients of the neighboring pixel positions respectively.

Figure 6H:
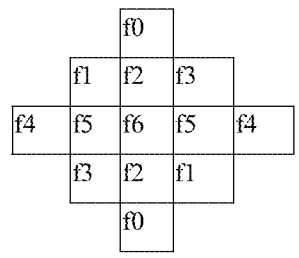

In another possible implementation, as shown in FIG. 6H, the CCALF filtering coefficient of the pixel position B1 is f0, the CCALF filtering coefficient of the pixel position B2 is f1, the CCALF filtering coefficient of the pixel position B3 is f2, the CCALF filtering coefficient of the pixel position B4 is f3, the CCALF filtering coefficient of the pixel position B5 is f4, the CCALF filtering coefficient of the pixel position B6 is f5, the CCALF filtering coefficient of the pixel position B7 is f6, the CCALF filtering coefficient of the pixel position B8 is f5, the CCALF filtering coefficient of the pixel position B9 is f4, the CCALF filtering coefficient of the pixel position B10 is f3, the CCALF filtering coefficient of the pixel position B11 is f2, the CCALF filtering coefficient of the pixel position B12 is f1, the CCALF filtering coefficient of the pixel position B13 is f0. To sum up, the CCALF filtering coefficient f0 of the pixel position B1 (the exactly-upper second row of pixel position) and the CCALF filtering coefficient f0 of the pixel position B13 (the exactly-lower second row of pixel position) are same; the CCALF filtering coefficient f1 of the pixel position B2 (the left upper pixel position) and the CCALF filtering coefficient f1 of the pixel position B12 (the right lower pixel position) are same; the CCALF filtering coefficient f2 of the pixel position B3 (the exactly-upper pixel position) and the CCALF filtering coefficient f2 of the pixel position B11 (the exactly-lower pixel position) are same; the CCALF filtering coefficient f3 of the pixel position B4 (the right upper pixel position) and the CCALF filtering coefficient f3 of the pixel position B10 (the left lower pixel position) are same; the CCALF filtering coefficient f4 of the pixel position B5 (the left pixel position of second column) and the CCALF filtering coefficient f4 of the pixel position B9 (the right pixel position of second column) are same; the CCALF filtering coefficient f5 of the pixel position B6 (the left pixel position) and the CCALF filtering coefficient f5 of the pixel position B8 (the right pixel position) are same. In the above manner, the CCALF filtering coefficients of different pixel positions are set to be same so as to simplify the design of the CCALF filtering coefficient and reduce the number of the CCALF filtering coefficients in the CCALF filtering coefficient set.

Figure 6I:
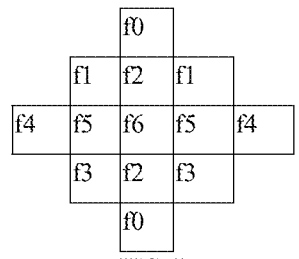

In another possible implementation, as shown in FIG. 6I, the CCALF filtering coefficient of the pixel position B1 is f0, the CCALF filtering coefficient of the pixel position B2 is f1, the CCALF filtering coefficient of the pixel position B3 is f2, the CCALF filtering coefficient of the pixel position B4 is f1, the CCALF filtering coefficient of the pixel position B5 is f4, the CCALF filtering coefficient of the pixel position B6 is f5, the CCALF filtering coefficient of the pixel position B7 is f6, the CCALF filtering coefficient of the pixel position B8 is f5, the CCALF filtering coefficient of the pixel position B9 is f4, the CCALF filtering coefficient of the pixel position B10 is f3, the CCALF filtering coefficient of the pixel position B11 is f2, the CCALF filtering coefficient of the pixel position B12 is f3, the CCALF filtering coefficient of the pixel position B13 is f0. To sum up, the CCALF filtering coefficient f0 of the pixel position B1 (the exactly-upper second row of pixel position) and the CCALF filtering coefficient f0 of the pixel position B13 (the exactly-lower second row of pixel position) are same; the CCALF filtering coefficient f1 of the pixel position B2 (the left upper pixel position) and the CCALF filtering coefficient f1 of the pixel position B4 (the right upper pixel position) are same; the CCALF filtering coefficient f2 of the pixel position B3 (the exactly-upper pixel position) and the CCALF filtering coefficient f2 of the pixel position B11 (the exactly-lower pixel position) are same; the CCALF filtering coefficient f4 of the pixel position B5 (the left pixel position of second column) and the CCALF filtering coefficient f4 of the pixel position B9 (the right pixel position of second column) are same; the CCALF filtering coefficient f5 of the pixel position B6 (the left pixel position) and the CCALF filtering coefficient f5 of the pixel position B8 (the right pixel position) are same; the CCALF filtering coefficient f3 of the pixel position B10 (the left lower pixel position) and the CCALF filtering coefficient f3 of the pixel position B12 (the right lower pixel position) are same. In the above manner, the CCALF filtering coefficients of different pixel positions are set to be same so as to simplify the design of the CCALF filtering coefficient and reduce the number of the CCALF filtering coefficients in the CCALF filtering coefficient set.

Of course, the above several manners are only examples and the CCALF filtering coefficients of any pixel positions can be set to be same, for example, as long as the same CCALF filtering coefficients have symmetry (e.g. axial symmetry or central symmetry), which is not limited herein.

Figure 6J:
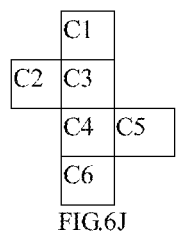

In a third case, FIG. 6J is a schematic diagram of a neighboring pixel position of a target pixel position. A pixel position C3 is the target pixel position, and the CCALF filtering coefficient set includes: the CCALF filtering coefficient of the exactly-upper pixel position (pixel position C1) of the target pixel position, the CCALF filtering coefficient of the left pixel position (pixel position C2) of the target pixel position, the CCALF filtering coefficient of the exactly-lower pixel position (pixel position C4) of the target pixel position, the CCALF filtering coefficient of the right lower pixel position (pixel position C5) of the target pixel position, the CCALF filtering coefficient of the exactly-lower second row of pixel position (pixel position C6) of the target pixel position.

Figure 6K:
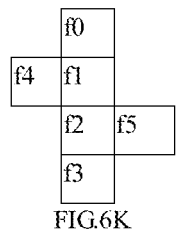

In a possible implementation, as shown in FIG. 6K, the CCALF filtering coefficient of the pixel position C1 is f0, the CCALF filtering coefficient of the pixel position C2 is f4, the CCALF filtering coefficient of the pixel position C3 is f1, the CCALF filtering coefficient of the pixel position C4 is f2, the CCALF filtering coefficient of the pixel position C5 is f5, the CCALF filtering coefficient of the pixel position C6 is f3. To sum up, the CCALF filtering coefficients of various pixel positions are different, f1 is the CCALF filtering coefficient of the target pixel position and f0, f2, f3, f4, f5 are the CCALF filtering coefficients of the neighboring pixel positions respectively.

Figure 6L:
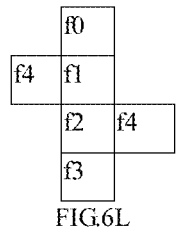

In another possible implementation, as shown in FIG. 6L, the CCALF filtering coefficient of the pixel position C1 is f0, the CCALF filtering coefficient of the pixel position C2 is f4, the CCALF filtering coefficient of the pixel position C3 is f1, the CCALF filtering coefficient of the pixel position C4 is f2, the CCALF filtering coefficient of the pixel position C5 is f4, the CCALF filtering coefficient of the pixel position C6 is f3. The CCALF filtering coefficient f4 of the pixel position C2 (the left pixel position) and the CCALF filtering coefficient f4 of the pixel position C5 (the right lower pixel position) are same. In the above manner, the CCALF filtering coefficients of different pixel positions are set to be same so as to simplify the design of the CCALF filtering coefficient and reduce the number of the CCALF filtering coefficients in the CCALF filtering coefficient set.

Of course, the above several manners are only examples and the CCALF filtering coefficients of any pixel positions can be set to be same, for example, as long as the same CCALF filtering coefficients have symmetry (e.g. axial symmetry or central symmetry), which is not limited herein.

Figure 6M:
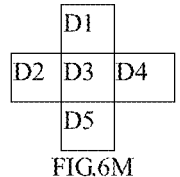

In a fourth case, FIG. 6M is a schematic diagram of a neighboring pixel position of a target pixel position. A pixel position D3 is the target pixel position, and the CCALF filtering coefficient set includes: the CCALF filtering coefficient of the exactly-upper pixel position (pixel position D1) of the target pixel position, the CCALF filtering coefficient of the left pixel position (pixel position D2) of the target pixel position, the CCALF filtering coefficient of the right pixel position (pixel position D4) of the target pixel position, the CCALF filtering coefficient of the exactly-lower pixel position (pixel position D5) of the target pixel position.

Figure 6N:
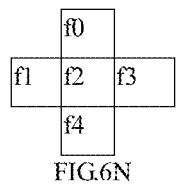

In a possible implementation, as shown in FIG. 6N, the CCALF filtering coefficient of the pixel position D1 is f0, the CCALF filtering coefficient of the pixel position D2 is f1, the CCALF filtering coefficient of the pixel position D3 is f2, the CCALF filtering coefficient of the pixel position D4 is f3, the CCALF filtering coefficient of the pixel position D5 is f4.

In a word, the CCALF filtering coefficients of various pixel positions are different, f2 is the CCALF filtering coefficient of the target pixel position and f0, f1, f3, f4 are the CCALF filtering coefficients of the neighboring pixel positions respectively.

Embodiment 14: in the above embodiment, based on the luma component reconstruction value of the target pixel position, the CCALF filtering coefficient of the target pixel position, the luma component reconstruction value of the neighboring pixel position and the CCALF filtering coefficient of the neighboring pixel position, CCALF-based filtering is performed to obtain a chroma component offset value of the current pixel position. In a possible implementation, transformation operation may be performed for the CCALF filtering coefficient of the neighboring pixel position to obtain a transformed CCALF filtering coefficient of the neighboring pixel position. Then, based on the luma component reconstruction value of the target pixel position, the CCALF filtering coefficient of the target pixel position, the luma component reconstruction value of the neighboring pixel position and the transformed CCALF filtering coefficient of the neighboring pixel position, CCALF-based filtering is performed to obtain the chroma component offset value of the current pixel position.

Illustratively, the above transformation operation may specifically include: rotational transformation operation; or, vertical flip transformation operation; or, diagonal flip transformation operation. For example, rotational transformation operation is performed for the CCALF filtering coefficient of the neighboring pixel position, or, vertical flip transformation operation is performed for the CCALF filtering coefficient of the neighboring pixel position, or, diagonal flip transformation operation is performed for the CCALF filtering coefficient of the neighboring pixel position. Of course, the above manners are only several examples and not limited herein. For example, based on a luma gradient parameter (the calculation manner of the gradient parameter is not limited herein), whether to perform transformation operation (geometric transformation mapping) for the CCALF filtering coefficient is determined; if yes, transformation operation is performed for the CCALF filtering coefficient of the neighboring pixel position.

For example, when diagonal flip transformation operation is performed for the CCALF filtering coefficient, the following formula 1 may be adopted:

$$f_D(k,s)=f(s,k) \quad \text{Formula 1}$$

When vertical flip transformation operation is performed for the CCALF filtering coefficient, the following formula 2 may be adopted:

$$f_V(k,s)=f(k,K-s-1) \quad \text{Formula 2}$$

When rotational transformation operation is performed for the CCALF filtering coefficient, the following formula 3 may be adopted:

$$f_R(k,s)=f(K-s-1,k) \quad \text{Formula 3}$$

In the above formula, $f_D(k,s)$ represents the CCALF filtering coefficient of the pixel position(k,s) after diagonal flip transformation operation; f(s,k) represents the CCALF filtering coefficient of the pixel position(s,k) before diagonal flip transformation operation; $f_V(k,s)$ represents the CCALF filtering coefficient of the pixel position(k,s) after vertical flip transformation operation; f(k,K−s−1) represents the CCALF filtering coefficient of the pixel position(k,K−s−1) before vertical flip transformation operation; $f_R(k,s)$ represents the CCALF filtering coefficient of the pixel position (k,s) after rotational transformation operation; f(K−s−1, k) represents the CCALF filtering coefficient of the pixel position(K−s−1, k) before rotational transformation operation.

Alternatively, $f_D(k,s)$ represents the CCALF filtering coefficient of the pixel position(k,s) before diagonal flip transformation operation; f(s,k) represents the CCALF filtering coefficient of the pixel position(s,k) after diagonal flip transformation operation; $f_V(k,s)$ represents the CCALF filtering coefficient of the pixel position(k,s) before vertical flip transformation operation; f(k,K−s−1) represents the CCALF filtering coefficient of the pixel position(k,K−s−1) after vertical flip transformation operation; $f_R(k,s)$ represents the CCALF filtering coefficient of the pixel position(k,s) before rotational transformation operation; f(K−s−1, k) represents the CCALF filtering coefficient of the pixel position (K−s−1, k) after rotational transformation operation.

In the above formula, K may be a size of a filter of a CCALF, 0<=k<=K−1, k and s are the coordinate of the pixel position, for example, (0,0) represents the left upper corner and (K−1, K−1) represents the right lower corner.

Embodiment 15: the implementation process of the above embodiment will be described below in combination with several specific application scenarios.

Application scenario 1: in encoded stream information, an SPS-level syntax element, or a frame-level syntax element, or a PPS-level syntax element may be added to control the CCALF to be turned on and off. For example, by adding the SPS-level syntax element to the encoded stream information, the CCALF is controlled to be used through the SPS-level syntax element, or not to be used through the SPS-level syntax element. For another example, by adding the frame-level syntax element to the encoded stream information, the CCALF is controlled to be used through the frame-level syntax element or not to be used through the frame-level syntax element. For another example, by adding the PPS-level syntax element to the encoded stream information, the CCALF is controlled to be used through the PPS-level syntax element, or not to be used through the PPS-level syntax element.

Application scenario 2: a minimum granularity for controlling whether to use the CCALF filtering process may be controlled at a CTB (Coding tree block) level, and each CTB has one flag for representing whether the current processing unit is allowed to enable the CCALF.

Application scenario 3: an SPS-level controller of the CCALF is independent of an SPS-level controller of the ALF. For example, the CCALF has a first controller of SPS-level, and the ALF has a second controller of SPS-level. The CCALF is controlled to be used or not to be used by the first controller and the ALF is controlled to be used or not to be used by the second controller.

For example, the CCALF may be controlled to be used by the first controller and the ALF may be controlled to be used by the second controller. Optionally, the CCALF may be controlled to be used by the first controller and the ALF may be controlled not to be used by the second controller. Optionally, the CCALF may be controlled not to be used by the first controller and the ALF may be controlled to be used by the second controller. Optionally, the CCALF may be controlled not to be used by the first controller and the ALF may be controlled not to be used by the second controller.

Application scenario 4: the CCALF and the ALF share one SPS-level controller, that is, one SPS-level controller controls both the ALF and the CCALF to be used or not to be used at the same time. For example, by the controller, the CCALF and the ALF are controlled to be used, or by the controller, the CCALF and the ALF are controlled not to be used.

Figure 7:
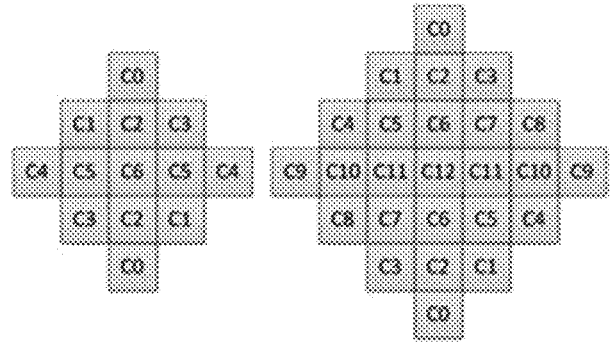
FIG. 7 is a schematic diagram illustrating a neighboring pixel position of an ALF according to an embodiment of the present disclosure.

Embodiment 16: For a filtering process of the ALF, a filter (e.g. Wiener filter) may be adopted to perform filtering operation with the purpose of minimizing a mean square error between filtering signal and original signal. As shown in FIG. 7, filters of two shapes may be provided, where the filter of 5*5 is applicable to chroma component and the filter of 7*7 is applicable to luma component. In the filter of 5*5, C6 is a central pixel position, and in the filter of 7*7, C12 is a central pixel position and other pixels are surrounding pixels. The central pixel position is a pixel position to be filtered by using the surrounding pixel positions.

For the luma component, different filters are used for different small blocks. Therefore, these small blocks may be classified to distinguish filters to be used for the small blocks, for example, this may be achieved by performing a quantization value based on direction D and activity A.

Illustratively, for the luma component, each small block of 4*4 is classified into 25 classes with class type being ClassIDX (including information: a difference of a primary direction and a gradient sum of the primary direction and its perpendicular direction in small block, and a gradient sum of perpendicular direction and horizontal direction), the calculation is as follows: C=5D+A where C represents a particular class of the 25 classes so as to known the small block is to use which filter. D represents the direction of the current processing unit, and A represents the activity of the current processing unit (the entire gradient value, i.e. the quantization value of the activity value). The determination of D and A is not limited herein as long as D and A can be obtained. Illustratively, D=0, 1, 2, 3, 4, A=0, 1, 2, 3, 4 and therefore, C value is 0 to 24, that is, 25 classification indexes.

For the chroma component, block classification is not required, and a single AFL coefficient set is applied in each chroma component, which is not limited herein.

Illustratively, the filtering parameter carried in the bit stream may involve the followings: different filters are applied to the luma component and the chroma component, and the filtering parameter information of the ALF is stated in the APS. One APS includes at most N luma filtering coefficients (N is preferably 25) and clip index information, and at most M chroma filtering coefficients (M is preferably 8) and clip index information are stated. Controlling the ALF to be used or not can be performed at several levels and the control syntax may be present in the SPS-level syntax, the slice level syntax or the frame-level syntax or the like. A minimum granularity for controlling whether to enable the ALF filtering process may be controlled at a CTB level, and each CTB has one flag for representing whether the current processing unit is allowed to enable the ALF.

Figure 8A:
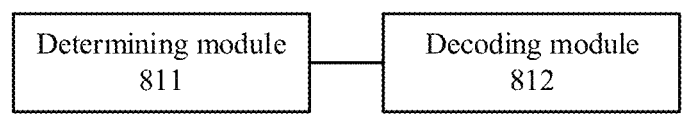
FIG. 8A is a structural schematic diagram illustrating a decoding apparatus according to an embodiment of the present disclosure.

Based on the same application idea as the above method, an embodiment of the present disclosure further provides a decoding apparatus, which is applied to a decoder. FIG. 8A is a structural diagram of the apparatus. The apparatus includes:

a determining module 811, configured to determine whether an adaptive loop filter (ALF) sequence control enabling flag of a sequence parameter set (SPS) syntax indicates a current sequence is allowed to enable ALF;

a decoding module 812, configured to, when the ALF sequence control enabling flag of the SPS syntax indicates allowing the current sequence to enable ALF, decode a cross-component adaptive loop filter (CCALF) sequence control enabling flag from the SPS syntax.

The decoding module 812 is further configured to: if the ALF sequence control enabling flag of the SPS syntax indicates allowing the current sequence to enable ALF and the current sequence has a chroma component, decode the CCALF sequence control enabling flag from the SPS syntax.

The decoding module 812 is further configured to: when the CCALF sequence control enabling flag is decoded from the SPS syntax, if a general constraint information syntax of a CCALF indicates disallowing enabling the CCALF, determine the CCALF sequence control enabling flag as a first value; or, if the general constraint information syntax of the CCALF indicates allowing enabling the CCALF, decode the CCALF sequence control enabling flag from the SPS syntax as a second value; where the first value indicates disallowing the current sequence to enable the CCALF; the second value indicates allowing the current sequence to enable the CCALF.

The decoding module 812 is further configured to: if the ALF sequence control enabling flag of the SPS syntax indicates allowing the current sequence to enable ALF and the PPS syntax indicates an ALF syntax is present in a picture header, decode an ALF picture header control enabling flag from a picture header syntax; if the ALF picture header control enabling flag of the picture header syntax indicates allowing a current picture to enable the ALF and the CCALF sequence control enabling flag of the SPS syntax indicates allowing the current sequence to enable the CCALF, decode a CCALF picture header control enabling flag from the picture header syntax.

The decoding module 812 is further configured to: if the ALF sequence control enabling flag of the SPS syntax indicates allowing the current sequence to enable ALF and the PPS syntax indicates the ALF syntax is present in a slice header, decode an ALF slice header control enabling flag from a slice header syntax; if the ALF slice header control enabling flag of the slice header syntax indicates allowing a current slice to enable the ALF and the CCALF sequence control enabling flag of the SPS syntax indicates allowing the current sequence to enable the CCALF, decode a CCALF slice header control enabling flag from the slice header syntax.

The decoding module 812 is further configured to: if the ALF sequence control enabling flag of the SPS syntax indicates allowing the current sequence to enable ALF and the picture header syntax indicates the ALF syntax is present in the picture header, decode the ALF picture header control enabling flag from the picture header syntax; if the ALF picture header control enabling flag of the picture header syntax indicates allowing the current picture to enable the ALF and the CCALF sequence control enabling flag of the SPS syntax indicates allowing the current sequence to enable the CCALF, decode the CCALF picture header control enabling flag from the picture header syntax.

The decoding module 812 is further configured to: if the ALF sequence control enabling flag of the SPS syntax indicates allowing the current sequence to enable ALF and the picture header syntax indicates the ALF syntax is present in the slice header, decode the ALF slice header control enabling flag from the slice header syntax; if the ALF slice header control enabling flag of the slice header syntax indicates allowing the current slice to enable the ALF and the CCALF sequence control enabling flag of the SPS syntax indicates allowing the current sequence to enable the CCALF, decode the CCALF slice header control enabling flag from the slice header syntax.

Figure 8B:
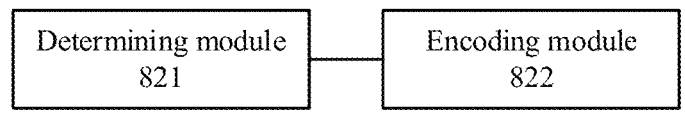
FIG. 8B is a structural schematic diagram illustrating an encoding apparatus according to an embodiment of the present disclosure.

Based on the same application idea as the above method, an embodiment of the present disclosure further provides an encoding apparatus, which is applied to an encoder. FIG. 8B is a structural diagram of the apparatus. The apparatus includes:

a determining module 821, configured to determine whether an adaptive loop filter (ALF) sequence control enabling flag of a sequence parameter set (SPS) syntax indicates a current sequence is allowed to enable an ALF;

an encoding module 822, configured to: when the ALF sequence control enabling flag of the SPS syntax indicates allowing the current sequence to enable ALF, encode a CCALF sequence control enabling flag in the SPS syntax.

The encoding module 822 is further configured to: if the ALF sequence control enabling flag of the SPS syntax indicates allowing the current sequence to enable ALF and the current sequence has a chroma component, encode the CCALF sequence control enabling flag in the SPS syntax.

The encoding module 822 is further configured to: if the ALF sequence control enabling flag of the SPS syntax indicates disallowing the current sequence to enable the ALF, prohibit the CCALF sequence control enabling flag to be encoded in the SPS syntax.

The encoding module 822 is further configured to: when the CCALF sequence control enabling flag is encoded in the SPS syntax, if a general constraint information syntax of a CCALF indicates disallowing enabling the CCALF, determine the CCALF sequence control enabling flag as a first value; or, if the general constraint information syntax of the CCALF indicates allowing enabling the CCALF, determine the CCALF sequence control enabling flag as a second value; where the first value indicates disallowing the current sequence to enable the CCALF; the second value indicates allowing the current sequence to enable the CCALF.

The encoding module 822 is further configured to: if the ALF sequence control enabling flag of the SPS syntax indicates allowing the current sequence to enable ALF and the PPS syntax indicates an ALF syntax is present in a picture header, encode an ALF picture header control enabling flag in a picture header syntax; if the ALF picture header control enabling flag of the picture header syntax indicates allowing a current picture to enable the ALF and the CCALF sequence control enabling flag of the SPS syntax indicates allowing the current sequence to enable the CCALF, encode a CCALF picture header control enabling flag in the picture header syntax.

The encoding module 822 is further configured to: if the ALF sequence control enabling flag of the SPS syntax indicates allowing the current sequence to enable ALF and the PPS syntax indicates the ALF syntax is present in a slice header, encode an ALF slice header control enabling flag in a slice header syntax; if the ALF slice header control enabling flag of the slice header syntax indicates allowing a current slice to enable the ALF and the CCALF sequence control enabling flag of the SPS syntax indicates allowing the current sequence to enable the CCALF, encode a CCALF slice header control enabling flag in the slice header syntax.

The encoding module 822 is further configured to: if the ALF sequence control enabling flag of the SPS syntax indicates allowing the current sequence to enable ALF and the picture header syntax indicates the ALF syntax is present in the picture header, encode the ALF picture header control enabling flag in the picture header syntax; if the ALF picture header control enabling flag of the picture header syntax indicates allowing the current picture to enable the ALF and the CCALF sequence control enabling flag of the SPS syntax indicates allowing the current sequence to enable the CCALF, encode the CCALF picture header control enabling flag in the picture header syntax.

The encoding module 822 is further configured to: if the ALF picture header control enabling flag of the picture header syntax indicates disallowing the current picture to enable the ALF, prohibit the CCALF picture header control enabling flag to be encoded in the picture header syntax.

The encoding module 822 is further configured to: if the ALF sequence control enabling flag of the SPS syntax indicates allowing the current sequence to enable ALF and the picture header syntax indicates the ALF syntax is present in the slice header, encode the ALF slice header control enabling flag in the slice header syntax; if the ALF slice header control enabling flag of the slice header syntax indicates allowing the current slice to enable the ALF and the CCALF sequence control enabling flag of the SPS syntax indicates allowing the current sequence to enable the CCALF, encode the CCALF slice header control enabling flag in the slice header syntax.

The encoding module 822 is further configured to: if the ALF slice header control enabling flag of the slice header syntax indicates disallowing the current slice to enable the ALF, prohibit the CCALF slice header control enabling flag to be encoded in the slice header syntax.

Figure 8C:
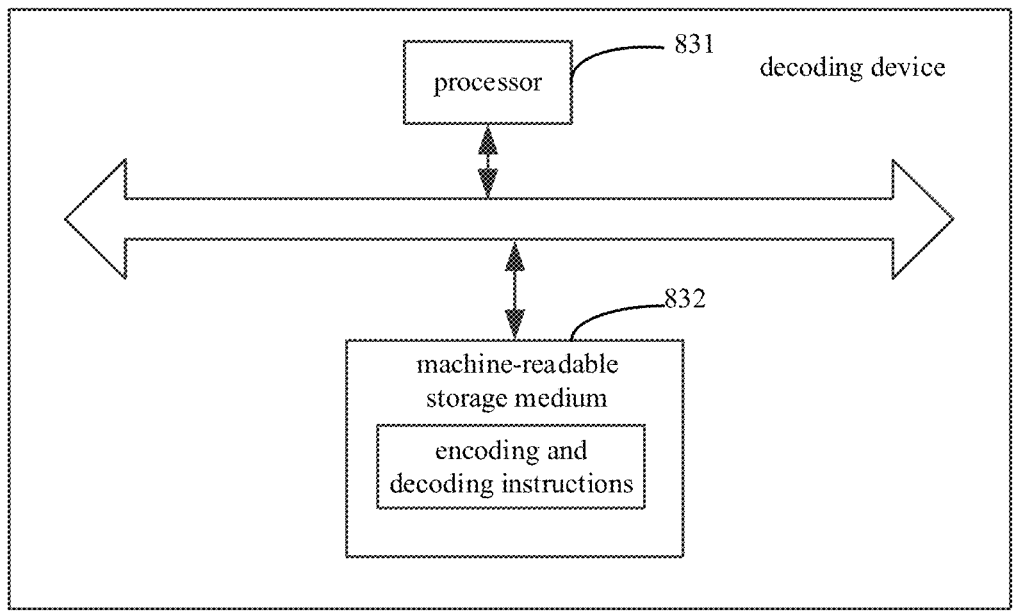
FIG. 8C is a schematic diagram illustrating a hardware structure of a decoder device according to an embodiment of the present disclosure.

Based on the same application idea as the above method, an embodiment of the present disclosure provides a decoder device (i.e. a video decoder), the hardware architecture diagram of which can be referred to FIG. 8C from the hardware level. The decoder device includes a processor 831 and a machine readable storage medium 832, where the machine readable storage medium 832 stores machine executable instructions executable by the processor 831; the processor 831 is configured to execute the machine executable instructions to perform the method disclosed in the above embodiments. For example, the processor 831 is configured to execute the machine executable instructions to perform the following step:

if an adaptive loop filter (ALF) sequence control enabling flag of a sequence parameter set (SPS) syntax indicates a current sequence is allowed to enable an ALF, decoding a cross-component adaptive loop filter (CCALF) sequence control enabling flag from the SPS syntax.

Figure 8D:
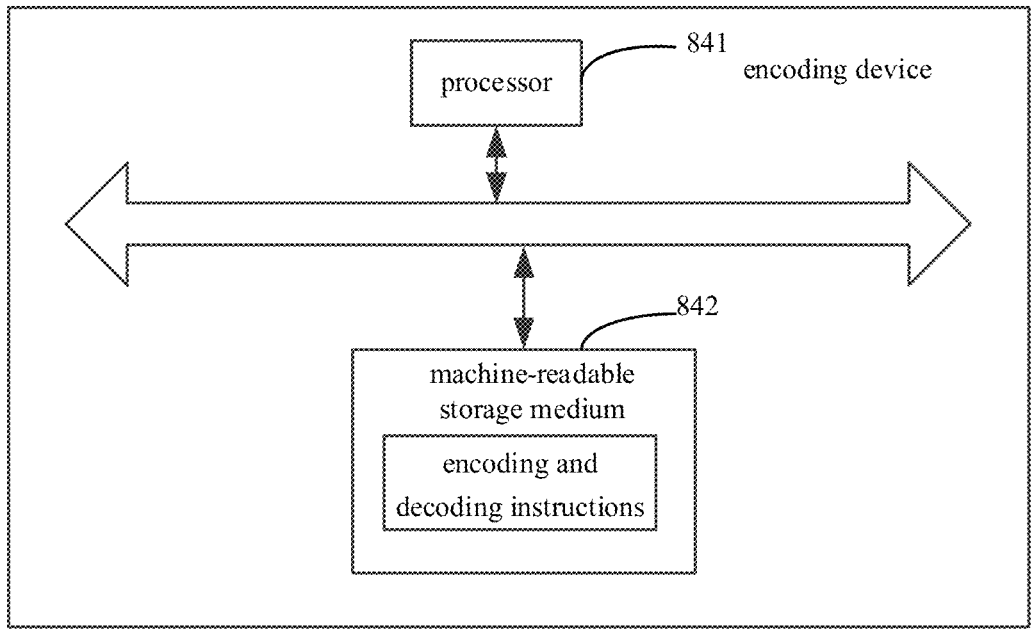
FIG. 8D is a schematic diagram illustrating a hardware structure of an encoder device according to an embodiment of the present disclosure.

Based on the same application idea as the above method, an embodiment of the present disclosure provides an encoder device (i.e. a video encoder), the hardware architecture diagram of which can be referred to FIG. 8D from the hardware level. The encoder device includes a processor 841 and a machine readable storage medium 842, where the machine readable storage medium 842 stores machine executable instructions executable by the processor 841; the processor 841 is configured to execute the machine executable instructions to perform the method disclosed in the above embodiments. For example, the processor 841 is configured to execute the machine executable instructions to perform the following step:

if an adaptive loop filter (ALF) sequence control enabling flag of a sequence parameter set (SPS) syntax indicates a current sequence is allowed to enable an ALF, encoding a cross-component adaptive loop filter (CCALF) sequence control enabling flag in the SPS syntax.

Based on the same application idea as the above method, an embodiment of the present disclosure further provides a machine-readable storage medium, and the machine-readable storage medium stores several computer instructions. The computer instructions are executed by a processor to implement the method of the embodiments of the present disclosure. Where, the machine-readable storage medium may be any electronic, magnetic, optical or other physical storage device, and may contain or store information such as executable instructions, and data, etc. For example, the machine-readable storage medium may be a Radom Access Memory (RAM), a volatile memory, a non-volatile memory, a flash memory, a memory driver (such as a hard disk drive), a solid state drive, storage disks of any type (such as compact discs, DVDS, etc.), or similar storage mediums, or a combination thereof.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a tablet computer, wearable device, or combinations of any several devices of these devices. For the convenience of description, the above-mentioned apparatus, when described, is divided into various units by function for descriptions. Of course, when the present disclosure is implemented, the functions of each unit can be implemented in one or more software and/or hardware.

Those skilled in the art should understand that the embodiments of the present disclosure may be provided as methods, systems, or computer program products. Therefore, the present disclosure may take the form of a pure hardware implementation, a pure software implementation, or an implementation combining software and hardware. Furthermore, the embodiments of the present disclosure may take the form of a computer program product implemented on one or more computer available storage mediums (including but not limited to disk memories, CD-ROM, optical memories, etc.) containing computer available program codes.

The present disclosure is described with reference to the flowcharts and/or block diagrams of the methods, devices (systems), and computer program products disclosed in the embodiments of the present disclosure. It should be understood that each step and/or block in the flowcharts and/or block diagrams and combinations of steps and/or blocks in the flowcharts and/or block diagrams may be implemented by computer program instructions. These computer program instructions may be provided to a processor of a general-purpose computer, a special-purpose computer, an embedded processor, or other programmable data processing equipment to produce a machine, so that the instructions executed by the processor or other programmable data processing device generate a device for implementing functions specified in one or more steps in the flowchart and/or in one or more blocks in the block diagram. These computer program instructions may also be stored in a computer readable memory capable of directing a computer or other programmable data processing device to operate in a particular manner, so that the instructions stored in the computer readable memory generate a manufactured product including an instruction device, where the instruction device implements the functions specified in one or more steps in the flowchart and/or one or more blocks in the block diagram.

These computer program instructions may also be stored in a computer readable memory capable of directing a computer or other programmable data processing device to operate in a particular manner, so that the instructions stored in the computer readable memory generate a manufactured product including an instruction device, where the instruction device implements the functions specified in one or more steps in the flowchart and/or one or more blocks in the block diagram. The computer program instructions may also be loaded on a computer or another programmable data processing device, so that a series of operation steps can be executed on the computer or another programmable device to generate processing achieved by the computer, and thus instructions executable on the computer or another programmable device are provided for steps for realizing functions designated in one or more steps of the flowcharts and/or one or more blocks of the block diagrams. The above descriptions are only some examples of the present disclosure, and are not used to limit the present disclosure. For those skilled in the art, the present disclosure may have various changes and modifications. Any modifications, equivalent replacements, improvements, etc. made in the spirit and principle of this present disclosure shall fall within the scope of claims of the present disclosure.

The invention claimed is:

1. A decoding method, comprising:
in response to determining that an adaptive loop filter (ALF) sequence control enabling flag of a sequence parameter set (SPS) syntax indicates allowing a current sequence to enable ALF, decoding a cross-component adaptive loop filter (CCALF) sequence control enabling flag from the SPS syntax;
wherein in response to determining, according decoded information of the CCALF control enabling flag, that CCALF is enabled for the current sequence, the method further comprises:
in response to determining that CCALF is enabled for a current processing unit, obtaining a luma component reconstruction value and a chroma component reconstruction value of each pixel position of the current processing unit;
for a current pixel position of the current processing unit, determining a target pixel position in the current processing unit associated with the current pixel position;
based on the luma component reconstruction value of the target pixel position, a CCALF filtering coefficient of the target pixel position, the luma component reconstruction values of neighboring pixel positions for the target pixel position and CCALF filtering coefficients of the neighboring pixel positions, performing CCALF-based filtering to obtain a chroma component offset value of the current pixel position;
based on the chroma component reconstruction value of the current pixel position and the chroma component offset value of the current pixel position, obtaining a target chroma component reconstruction value of the current pixel position;
wherein, the neighboring pixel positions for the target pixel position comprises: an exactly-upper pixel position of the target pixel position, a left pixel position of the target pixel position, a right pixel position of the target pixel position, an exactly-lower pixel position of the target pixel position, a left lower pixel position of the target pixel position, a right lower pixel position of the target pixel position, an exactly-lower second row of pixel position of the target pixel position;
wherein the CCALF filtering coefficients of the neighboring pixel positions comprise: a CCALF filtering coefficient of the exactly-upper pixel position of the target pixel position; a CCALF filtering coefficient of the left pixel position of the target pixel position; a CCALF filtering coefficient of the right pixel position of the target pixel position; a CCALF filtering coefficient of the exactly-lower pixel position of the target pixel position; a CCALF filtering coefficient of the left lower pixel position of the target pixel position; a CCALF filtering coefficient of the right lower pixel position of the target pixel position; a CCALF filtering coefficient of the exactly-lower second row of pixel position of the target pixel position;
wherein, a process of obtaining the CCALF filtering coefficients of the neighboring pixel positions comprises: decoding the CCALF filtering coefficients of the neighboring pixel positions from a bit stream; wherein, for each of the CCALF filtering coefficients, a range of the CCALF filtering coefficient is {−64, −32, −16, −8, −4, −2, −1, 0, 1, 2, 4, 8, 16, 32, 64}; wherein, the CCALF filtering coefficient of the target pixel position is not included in the bit stream, the CCALF filtering coefficient of the target pixel position is obtained by a decoder;
wherein, decoding the CCALF filtering coefficients of the neighboring pixel positions from the bit stream comprises: for each of the CCALF filtering coefficients, decoding an index value of an amplitude of the CCALF filtering coefficient by fixed-length code decoding to obtain the amplitude of the CCALF filtering coefficient decoding a sign bit of the CCALF filtering coefficient to obtain the sign bit of the CCALF filtering coefficient and based on the amplitude and the sign bit of the CCALF filtering coefficient, determining the CCALF filtering coefficient.

2. The method of claim 1, wherein the method further comprising:
   in response to determining that the ALF sequence control enabling flag of the SPS syntax indicates allowing the current sequence to enable ALF, and the current sequence has a chroma component, decoding the CCALF sequence control enabling flag from the SPS syntax.

3. The method of claim 1 or 2, wherein the method further comprising:
   when the CCALF sequence control enabling flag is decoded from the SPS syntax, in response to determining that a general constraint information syntax of CCALF indicates disallowing enabling CCALF, determining the CCALF sequence control enabling flag as a first value; or,
   in response to determining that the general constraint information syntax of CCALF indicates allowing enabling CCALF, decoding the CCALF sequence control enabling flag from the SPS syntax as a second value;
   wherein the first value indicates disallowing the current sequence to enable CCALF;
   the second value indicates allowing the current sequence to enable CCALF.

4. The method of claim 1, wherein the method further comprising:
   in response to determining that the ALF sequence control enabling flag of the SPS syntax indicates allowing the current sequence to enable ALF, and a PPS syntax indicates that an ALF syntax is present in a picture header, decoding an ALF picture header control enabling flag from a picture header syntax;
   in response to determining that the ALF picture header control enabling flag of the picture header syntax indicates allowing a current picture to enable ALF, and the CCALF sequence control enabling flag of the SPS syntax indicates allowing the current sequence to enable CCALF, decoding a CCALF picture header control enabling flag from the picture header syntax.

5. The method of claim 1, wherein the method further comprising:
   in response to determining that the ALF sequence control enabling flag of the SPS syntax indicates allowing the current sequence to enable ALF, and the PPS syntax indicates that an ALF syntax is present in a slice header, decoding an ALF slice header control enabling flag from a slice header syntax;
   in response to determining that the ALF slice header control enabling flag of the slice header syntax indicates allowing a current slice to enable ALF, and the CCALF sequence control enabling flag of the SPS syntax indicates allowing the current sequence to enable CCALF, decoding a CCALF slice header control enabling flag from the slice header syntax.

6. The method of claim 1, wherein the method further comprising:
   in response to determining that the ALF sequence control enabling flag of the SPS syntax indicates allowing the current sequence to enable ALF, and the picture header syntax indicates that the ALF syntax is present in the picture header, decoding the ALF picture header control enabling flag from the picture header syntax;
   in response to determining that the ALF picture header control enabling flag of the picture header syntax indicates allowing the current picture to enable ALF and the CCALF sequence control enabling flag of the SPS syntax indicates allowing the current sequence to enable CCALF, decoding the CCALF picture header control enabling flag from the picture header syntax.

7. The method of claim 1, wherein the method further comprising:
   in response to determining that the ALF sequence control enabling flag of the SPS syntax indicates allowing the current sequence to enable ALF, and the picture header syntax indicates that the ALF syntax is present in the slice header, decoding the ALF slice header control enabling flag from the slice header syntax;
   in response to determining that the ALF slice header control enabling flag of the slice header syntax indicates allowing the current slice to enable ALF and the CCALF sequence control enabling flag of the SPS syntax indicates allowing the current sequence to enable CCALF, decoding the CCALF slice header control enabling flag from the slice header syntax.

8. An encoding method, comprising:
   in response to determining that an adaptive loop filter (ALF) sequence control enabling flag of a sequence parameter set (SPS) syntax indicates allowing a current sequence to enable an ALF, encoding a cross-component adaptive loop filter (CCALF) sequence control enabling flag in the SPS syntax;
   wherein in response to determining that decoded information of the CCALF control enabling flag represents that CCALF is enabled for the current sequence, the method further comprises:
   in response to determining that CCALF is enabled for a current processing unit obtaining a luma component reconstruction value and a chroma component reconstruction value of each pixel position of the current processing unit;
   for a current pixel position of the current processing unit, determining a target pixel position in the current processing unit associated with the current pixel position;
   based on the luma component reconstruction value of the target pixel position, a CCALF filtering coefficient of the target pixel position, the luma component reconstruction values of neighboring pixel positions for the target pixel position and CCALF filtering coefficients of the neighboring pixel positions, performing CCALF-based filtering to obtain a chroma component offset value of the current pixel position;
   based on the chroma component reconstruction value of the current pixel position and the chroma component offset value of the current pixel position, obtaining a target chroma component reconstruction value of the current pixel position;
   wherein, the neighboring pixel positions for the target pixel position comprises: an exactly-upper pixel position of the target pixel position, a left pixel position of the target pixel position, a right pixel position of the target pixel position, an exactly-lower pixel position of the target pixel position, a left lower pixel position of the target pixel position, a right lower pixel position of the target pixel position, an exactly-lower second row of pixel position of the target pixel position;
   wherein the CCALF filtering coefficients of the neighboring pixel positions comprise: a CCALF filtering coefficient of the exactly-upper pixel position of the target pixel position; a CCALF filtering coefficient of the left pixel position of the target pixel position; a CCALF filtering coefficient of the right pixel position of the target pixel position; a CCALF filtering coefficient of the exactly-lower pixel position of the target pixel position; a CCALF filtering coefficient of the left lower pixel position of the target pixel position; a CCALF filtering coefficient of the right lower pixel position of the target pixel position; a CCALF filtering coefficient of the exactly-lower second row of pixel position of the target pixel position;

wherein, the method further comprises: encoding the CCALF filtering coefficients of the neighboring pixel positions in a bit stream; wherein, for each of the CCALF filtering coefficients, a range of the CCALF filtering coefficient is {−64, −32, −16, −8, −4, −2, −1, 0, 1, 2, 4, 8, 16, 32, 64}; wherein, the CCALF filtering coefficient of the target pixel position is not included in the bit stream, the CCALF filtering coefficient of the target pixel position is obtained by a decoder;

wherein, encoding the CCALF filtering coefficients of the neighboring pixel positions in the bit stream comprises: for each of the CCALF filtering coefficients, encoding an index value of the amplitude of the CCALF filtering coefficient by fixed-length code decoding; and encoding a sign bit of the CCALF filtering coefficient.

9. The method of claim 8, wherein, the method further comprising:
in response to determining that the ALF sequence control enabling flag of the SPS syntax indicates allowing the current sequence to enable ALF and the current sequence has a chroma component, encoding a CCALF sequence control enabling flag in the SPS syntax.

10. The method of claim 8, wherein the method further comprising:
in response to determining that the ALF sequence control enabling flag of the SPS syntax indicates disallowing the current sequence to enable ALF, prohibiting encoding the CCALF sequence control enabling flag in the SPS syntax.

11. The method of claim 8, wherein when the CCALF sequence control enabling flag is encoded in the SPS syntax, in response to determining that a general constraint information syntax of a CCALF indicates disallowing enabling CCALF, the CCALF sequence control enabling flag is a first value; or, if the general constraint information syntax of the CCALF indicates allowing enabling CCALF, the CCALF sequence control enabling flag is a second value;
wherein the first value indicates disallowing the current sequence to enable CCALF;
the second value indicates allowing the current sequence to enable CCALF.

12. The method of claim 8, wherein the method further comprising:
in response to determining that the ALF sequence control enabling flag of the SPS syntax indicates allowing the current sequence to enable ALF and the PPS syntax indicates that an ALF syntax is present in a picture header, encoding an ALF picture header control enabling flag in a picture header syntax;
in response to determining that the ALF picture header control enabling flag of the picture header syntax indicates allowing a current picture to enable ALF and the CCALF sequence control enabling flag of the SPS syntax indicates allowing the current sequence to enable CCALF, encoding a CCALF picture header control enabling flag from the picture header syntax.

13. The method of claim 8, wherein the method further comprising:
in response to determining that the ALF sequence control enabling flag of the SPS syntax indicates allowing the current sequence to enable ALF and the PPS syntax indicates that an ALF syntax is present in a slice header, encoding an ALF slice header control enabling flag in a slice header syntax;
in response to determining that the ALF slice header control enabling flag of the slice header syntax indicates allowing a current slice to enable ALF and the CCALF sequence control enabling flag of the SPS syntax indicates allowing the current sequence to enable CCALF, encoding a CCALF slice header control enabling flag in the slice header syntax.

14. The method of claim 8, wherein the method further comprising:
in response to determining that the ALF sequence control enabling flag of the SPS syntax indicates allowing the current sequence to enable ALF and the picture header syntax indicates that the ALF syntax is present in the picture header, encoding the ALF picture header control enabling flag in the picture header syntax;
in response to determining that the ALF picture header control enabling flag of the picture header syntax indicates allowing the current picture to enable ALF and the CCALF sequence control enabling flag of the SPS syntax indicates allowing the current sequence to enable CCALF, encoding the CCALF picture header control enabling flag in the picture header syntax.

15. The method of claim 12, wherein the method further comprising:
in response to determining that the ALF picture header control enabling flag of the picture header syntax indicates disallowing the current picture to enable ALF, prohibiting encoding the CCALF picture header control enabling flag in the picture header syntax.

16. The method of claim 8, wherein the method further comprising:
in response to determining that the ALF sequence control enabling flag of the SPS syntax indicates allowing the current sequence to enable ALF and the picture header syntax indicates that the ALF syntax is present in the slice header, encoding the ALF slice header control enabling flag in the slice header syntax;
in response to determining that the ALF slice header control enabling flag of the slice header syntax indicates allowing the current slice to enable ALF and the CCALF sequence control enabling flag of the SPS syntax indicates allowing the current sequence to enable CCALF, encoding the CCALF slice header control enabling flag in the slice header syntax.

17. The method of claim 13, wherein the method further comprising:
in response to determining that the ALF slice header control enabling flag of the slice header syntax indicates disallowing the current slice to enable ALF, prohibiting encoding the CCALF slice header control enabling flag in the slice header syntax.

18. A decoder device, comprising: a processor and a machine-readable storage medium, wherein the machine-readable storage medium stores machine executable instructions executable by the processor;
the processor is configured to execute the machine executable instructions to perform operations comprising:
in response to determining that an adaptive loop filter (ALF) sequence control enabling flag of a sequence parameter set (SPS) syntax indicates allowing a current sequence to enable ALF, decoding a cross-component adaptive loop filter (CCALF) sequence control enabling flag from the SPS syntax;

wherein in response to determining, according decoded information of the CCALF control enabling flag, that CCALF is enabled for the current sequence, the method further comprises:

in response to determining that CCALF is enabled for a current processing unit, obtaining a luma component reconstruction value and a chroma component reconstruction value of each pixel position of the current processing unit;

for a current pixel position of the current processing unit, determining a target pixel position in the current processing unit associated with the current pixel position;

based on the luma component reconstruction value of the target pixel position, a CCALF filtering coefficient of the target pixel position, the luma component reconstruction values of neighboring pixel positions for the target pixel position and CCALF filtering coefficients of the neighboring pixel positions, performing CCALF-based filtering to obtain a chroma component offset value of the current pixel position;

based on the chroma component reconstruction value of the current pixel position and the chroma component offset value of the current pixel position, obtaining a target chroma component reconstruction value of the current pixel position;

wherein, the neighboring pixel positions for the target pixel position comprises: an exactly-upper pixel position of the target pixel position, a left pixel position of the target pixel position, a right pixel position of the target pixel position, an exactly-lower pixel position of the target pixel position, a left lower pixel position of the target pixel position, a right lower pixel position of the target pixel position, an exactly-lower second row of pixel position of the target pixel position;

wherein the CCALF filtering coefficients of the neighboring pixel positions comprise: a CCALF filtering coefficient of the exactly-upper pixel position of the target pixel position; a CCALF filtering coefficient of the left pixel position of the target pixel position; a CCALF filtering coefficient of the right pixel position of the target pixel position; a CCALF filtering coefficient of the exactly-lower pixel position of the target pixel position; a CCALF filtering coefficient of the left lower pixel position of the target pixel position; a CCALF filtering coefficient of the right lower pixel position of the target pixel position; a CCALF filtering coefficient of the exactly-lower second row of pixel position of the target pixel position;

wherein, a process of obtaining the CCALF filtering coefficients of the neighboring pixel positions comprises: decoding the CCALF filtering coefficients of the neighboring pixel positions from a bit stream; wherein, for each of the CCALF filtering coefficients, a range of the CCALF filtering coefficient is $\{-64, -32, -16, -8, -4, -2, -1, 0, 1, 2, 4, 8, 16, 32, 64\}$; wherein, the CCALF filtering coefficient of the target pixel position is not included in the bit stream, the CCALF filtering coefficient of the target pixel position is obtained by a decoder;

wherein, decoding the CCALF filtering coefficients of the neighboring pixel positions from the bit stream comprises: for each of the CCALF filtering coefficients, decoding an index value of an amplitude of the CCALF filtering coefficient by fixed-length code decoding to obtain the amplitude of the CCALF filtering coefficient decoding a sign bit of the CCALF filtering coefficient to obtain the sign bit of the CCALF filtering coefficient and based on the amplitude and the sign bit of the CCALF filtering coefficient, determining the CCALF filtering coefficient.

19. An encoder device, comprising a processor and a machine-readable storage medium, wherein the machine-readable storage medium stores machine executable instructions executable by the processor;

the processor is configured to execute the machine executable instructions to perform the encoding method according to claim 8.

20. A non-transitory machine-readable storage medium, coupled to a processor, having machine-executable instructions stored thereon that, when executed by the processor, cause the processor to perform the decoding method according to claim 1.

* * * * *